(12) United States Patent
Okada et al.

(10) Patent No.: US 11,252,357 B2
(45) Date of Patent: Feb. 15, 2022

(54) IMAGE-CAPTURING DEVICE AND ELECTRONIC APPARATUS FOR SUPPRESSING NOISE

(71) Applicant: SONY SEMICONDUCTOR SOLUTIONS CORPORATION, Kanagawa (JP)

(72) Inventors: Chihiro Okada, Tokyo (JP); Hiroaki Nishiya, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/976,243

(22) PCT Filed: Feb. 20, 2019

(86) PCT No.: PCT/JP2019/006221
§ 371 (c)(1),
(2) Date: Aug. 27, 2020

(87) PCT Pub. No.: WO2019/171946
PCT Pub. Date: Sep. 12, 2019

(65) Prior Publication Data
US 2020/0412987 A1    Dec. 31, 2020

(30) Foreign Application Priority Data
Mar. 5, 2018    (JP) .............................. JP2018-038234

(51) Int. Cl.
*H04N 5/363* (2011.01)
*H04N 5/378* (2011.01)

(52) U.S. Cl.
CPC ............. *H04N 5/363* (2013.01); *H04N 5/378* (2013.01)

(58) Field of Classification Search
CPC .............................. H04N 5/363; H04N 5/378
See application file for complete search history.

(56) References Cited

U.S. PATENT DOCUMENTS

| 2007/0007438 A1* | 1/2007 | Liu | H04N 5/378 |
| | | | 250/214 AG |
| 2007/0262238 A1* | 11/2007 | Takashima | H04N 3/155 |
| | | | 250/208.1 |

(Continued)

FOREIGN PATENT DOCUMENTS

| EP | 2533521 A1 | 12/2012 |
| JP | 2004-140149 A | 5/2000 |

(Continued)

OTHER PUBLICATIONS

International Search Report and Written Opinion of PCT Application No. PCT/JP2019/006221, dated May 28, 2019, 10 pages of ISRWO.

*Primary Examiner* — Nicholas G Giles
(74) *Attorney, Agent, or Firm* — Chip Law Group

(57) ABSTRACT

The present technology relates to an image-capturing device and an electronic apparatus that are capable of reducing kTC noise. A sample-hold unit that performs sampling and holding of a pixel signal, an analog-digital (AD) conversion unit that performs AD conversion of the pixel signal, and a setting unit that sets a transconductance of an operational amplifier included in the sample-hold unit to a transconductance where kTC noise is minimized are included. Alternatively, a sample-hold unit that performs sampling and holding of a pixel signal, a kTC cancellation unit that reduces kTC noise in the sample-hold unit, an analog-digital (AD) conversion unit that performs AD conversion of the pixel signal, and a setting unit that sets a capacitance value of a (Continued)

capacitor included in the kTC cancellation unit to a capacitance value where the kTC noise is minimized are included.

8 Claims, 25 Drawing Sheets

(56) References Cited

U.S. PATENT DOCUMENTS

| | | | |
|---|---|---|---|
| 2012/0194367 A1* | 8/2012 | Wang | H04N 5/378 341/120 |
| 2012/0305751 A1 | 12/2012 | Kusuda | |
| 2013/0271632 A1* | 10/2013 | Eshel | H04N 5/378 348/300 |

FOREIGN PATENT DOCUMENTS

| | | |
|---|---|---|
| JP | 2007-043258 A | 2/2007 |
| JP | 2009-141612 A | 6/2009 |
| JP | 2017-228885 A | 12/2017 |
| WO | 2011/096207 A1 | 8/2011 |
| WO | 2017/221715 A1 | 12/2017 |

* cited by examiner

IMAGE-CAPTURING DEVICE AND ELECTRONIC APPARATUS FOR SUPPRESSING NOISE

CROSS REFERENCE TO RELATED APPLICATIONS

This application is a U.S. National Phase of International Patent Application No. PCT/JP2019/006221 filed on Feb. 20, 2019, which claims priority benefit of Japanese Patent Application No. JP 2018-038234 filed in the Japan Patent Office on Mar. 5, 2018. Each of the above-referenced applications is hereby incorporated herein by reference in its entirety.

TECHNICAL FIELD

The present technology relates to an image-capturing device and an electronic apparatus, and relates to, for example, an image-capturing device and an electronic apparatus that are capable of suppressing noise.

BACKGROUND ART

Conventionally, in an electronic apparatus with an image capturing function such as a digital still camera or a digital video camera, an image-capturing device such as a charge coupled device (CCD) or a complementary metal oxide semiconductor (CMOS) image sensor is used, for example.

The image-capturing device has a pixel in which a photodiode (PD) performing photoelectric conversion and a plurality of transistors are combined, and an image is constructed on the basis of pixel signals output from a plurality of pixels arranged in a planar manner. In addition, the pixel signals output from the pixels are subjected to AD conversion in parallel by a plurality of analog-to-digital (AD) converters arranged for each column of pixels, for example, and are output.

Patent Document 1 proposes performing reading twice before and after the start of exposure as a method of performing cancellation including kTC noise for each pixel. In this proposal, first, a reset is performed before the start of exposure, and a reset signal for each pixel is acquired for all effective pixels and stored in a memory or the like as digital data. CDS is performed by subtracting those reset signals from the accumulated signals acquired after the completion of exposure.

CITATION LIST

Patent Document

Patent Document 1: Japanese Patent Application Laid-Open No. 2004-140149

SUMMARY OF THE INVENTION

Problems to be Solved by the Invention

Since the generation amount of noise may change due to a change in an environment such as temperature, it is desired to be capable of performing noise cancellation corresponding to a change in the generation amount of noise, and to be capable of performing noise cancellation with higher accuracy.

The present technology has been made in view of such a situation, and is to make it possible to more accurately perform processing for canceling noise.

Solutions to Problems

A first image-capturing device of one aspect of the present technology includes a sample-hold unit that performs sampling and holding of a pixel signal, an analog-digital (AD) conversion unit that performs AD conversion of the pixel signal, and a setting unit that sets the transconductance of an operational amplifier included in the sample-hold unit to a transconductance where kTC noise is minimized.

A second image-capturing device of one aspect of the present technology includes a sample-hold unit that performs sampling and holding of a pixel signal, a kTC cancellation unit that reduces kTC noise in the sample-hold unit, an analog-digital (AD) conversion unit that performs AD conversion of the pixel signal, and a setting unit that sets a capacitance value of a capacitor included in the kTC cancellation unit to a capacitance value where the kTC noise is minimized.

A first electronic apparatus of one aspect of the present technology includes an image-capturing device, and a signal processing unit that processes a signal that is output from the image-capturing device, in which the image-capturing device includes a sample-hold unit that performs sampling and holding of a pixel signal, an analog-digital (AD) conversion unit that performs AD conversion of the pixel signal, and a setting unit that sets the transconductance of an operational amplifier included in the sample-hold unit to a transconductance where kTC noise is minimized.

A second electronic apparatus of one aspect of the present technology includes an image-capturing device, and a signal processing unit that processes a signal that is output from the image-capturing device, in which the image-capturing device includes a sample-hold unit that performs sampling and holding of a pixel signal, a kTC cancellation unit that reduces kTC noise in the sample-hold unit, an analog-digital (AD) conversion unit that performs AD conversion of the pixel signal, and a setting unit that sets a capacitance value of a capacitor included in the kTC cancellation unit to a capacitance value where the kTC noise is minimized.

The first image-capturing device of one aspect of the present technology performs sampling and holding of a pixel signal, performs AD conversion of the pixel signal, and setting of the transconductance of an operational amplifier to a transconductance where the kTC noise is minimized.

The second image-capturing device of one aspect of the present technology performs sampling and holding of a pixel signal, reducing kTC noise, performs AD conversion of the pixel signal, and setting of the capacitance value of a capacitor to a capacitance value where the kTC noise is minimized.

The first electronic apparatus of one aspect of the present technology includes the first image-capturing device.

The second electronic apparatus of one aspect of the present technology includes the second image-capturing device.

It is to be noted that the image-capturing device may be an independent apparatus or an internal block constituting one apparatus.

Effects of the Invention

According to one aspect of the present technology, processing for canceling noise can be performed more accurately.

It is to be noted that the effects described herein are not necessarily limited, and may be any of the effects described in the present disclosure.

MODE FOR CARRYING OUT THE INVENTION

Hereinafter, an embodiment of the present technology (hereinafter referred to as an embodiment) will be described.
<Configuration of Image-Capturing Apparatus>

Since the present technology can be applied to an image-capturing apparatus, the following description will be given with an example in which the present technology is applied to an image-capturing apparatus. It is to be noted that although the description will be continued with an image-capturing apparatus as an example here, the present technology is not limited to the application to the image-capturing apparatus, and is applicable to overall electronic apparatuses that use the image-capturing apparatus in an image capturing unit (photoelectric conversion unit), such as an image-capturing apparatus such as a digital still camera and a video camera, a mobile terminal apparatus having an image-capturing function such as a mobile telephone, and a copy machine using the image-capturing apparatus in an image reading section. It is to be noted that in some cases, a form of a module-type to be mounted on an electronic apparatus, i.e., a camera module is assumed as the image-capturing apparatus.

Figure 1:
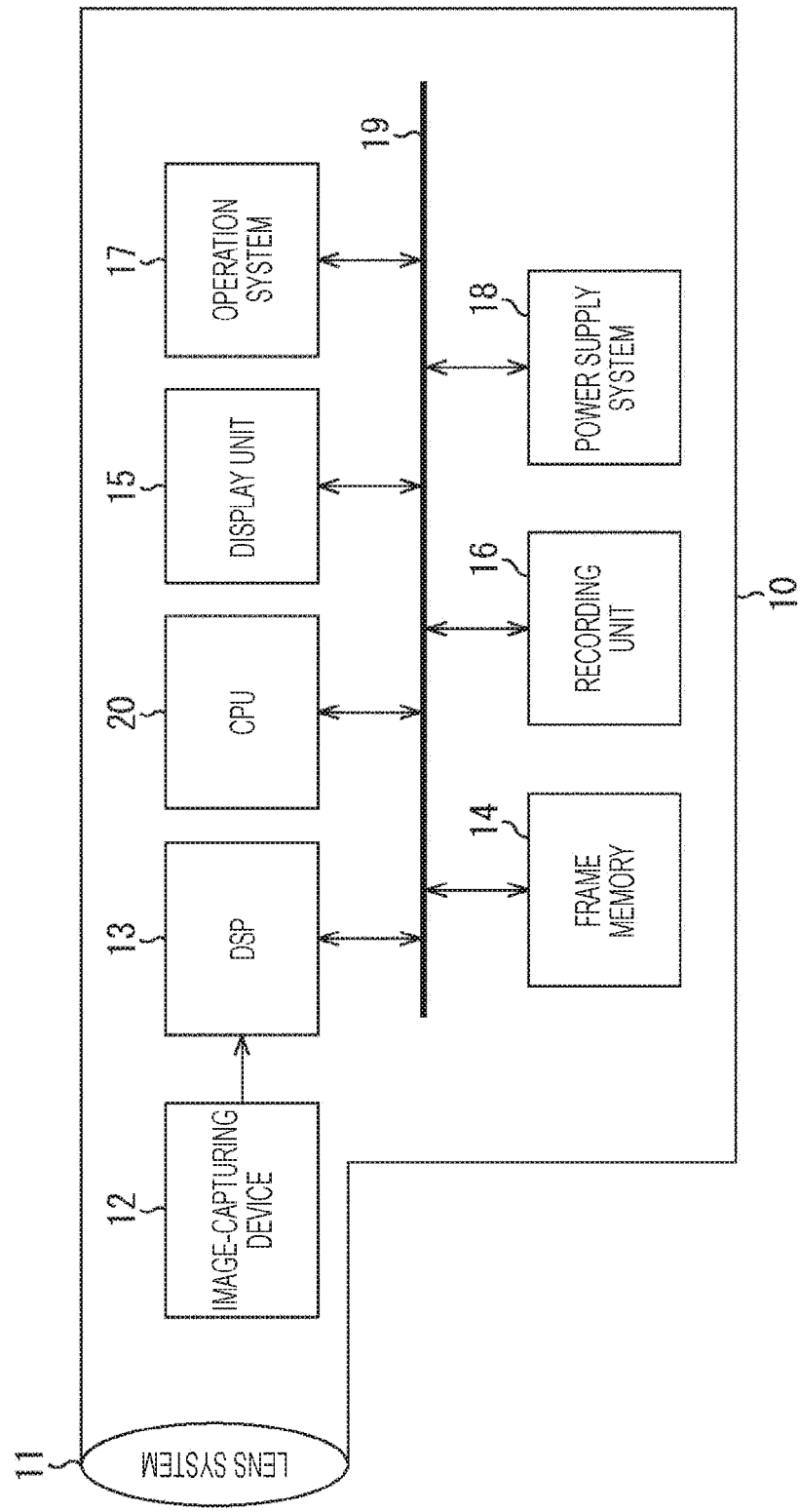
FIG. 1 is a diagram showing a configuration example of an image-capturing apparatus.

FIG. 1 is a block diagram showing a configuration example of an image-capturing apparatus that is an example of an electronic apparatus of the present disclosure. As shown in FIG. 1, an image-capturing apparatus 10 has an optical system including a lens group 11 and the like, an image-capturing device 12, a DSP circuit 13, which is a camera signal processing unit, a frame memory 14, a display unit 15, a recording unit 16, an operation system 17, a power supply system 18, and the like.

Then, the DSP circuit 13, the frame memory 14, the display unit 15, the recording unit 16, the operation system 17, and the power supply system 18 are connected to one another via a bus line 19. A CPU 20 controls each unit in the image-capturing apparatus 10.

The lens group 11 captures incident light (image light) from a subject and forms an image on an image capturing surface of the image-capturing device 12. The image-capturing device 12 converts the quantity of incident light with which an image is formed on the image-capturing surface by the lens group 11 into an electric signal in units of pixel and outputs the electric signal as a pixel signal. As the image-capturing device 12, an image-capturing device (image sensor) including a pixel described below can be used.

The display unit 15 includes a panel-type display unit such as a liquid crystal display unit and an organic electro luminescence (EL) display unit, and displays a moving image or a still image captured by the image-capturing device 12. The recording unit 16 records a moving image or a still image captured by the image-capturing device 12 on a recording medium such as a video tape or a digital versatile disk (DVD).

The operation system 17 issues an operation command for various functions of the present image-capturing apparatus under an operation by a user. The power supply system 18 appropriately supplies various types of power supplies to the DSP circuit 13, the frame memory 14, the display unit 15, the recording unit 16, and the operation system 17 as operating power supplies for those supply targets.

<Configuration of Image-Capturing Device>

Figure 2:
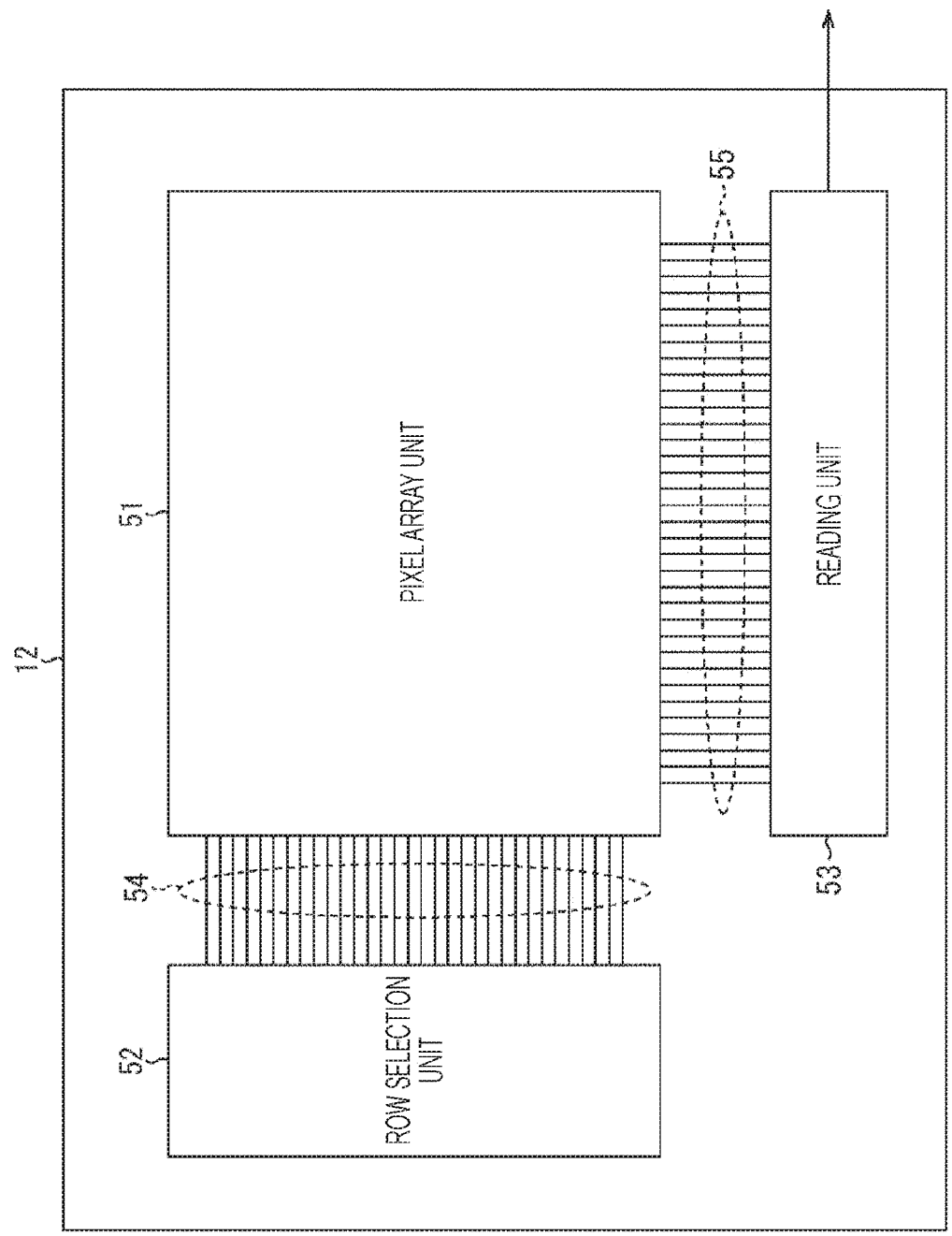
FIG. 2 is a diagram showing a configuration example of an image-capturing device.

FIG. 2 is a block diagram showing a configuration example of the image-capturing device 12. The image-capturing device 12 can be a complementary metal oxide semiconductor (CMOS) image sensor. The image-capturing device 12 has a pixel array unit 51, a row selection unit 52 as a pixel drive unit, and a reading unit 53.

In the pixel array unit 51, a plurality of pixels 50 (FIG. 3) is arrayed in a two-dimensional shape (matrix) of M rows by N columns. In a control line 54 wired to the pixel array unit 51, a set of a transfer line, a reset line, and a row selection line is wired in units of row of the pixel array. M control lines of the transfer line, M control lines of the reset line, and M control lines of the row selection line are provided. The transfer line, the reset line, and the row selection line are driven by the row selection unit 52.

The row selection unit 52 controls the operation of pixels arranged in any row in the pixel array unit 51. The row selection unit 52 controls the pixel unit through the control line 54. The reading unit 53 receives via a vertical signal line 55 data of the pixel row read and controlled by the row selection unit 52, and transfers the data to the signal processing unit in the subsequent stage. A constant current unit and the reading unit 53 are connected to the vertical signal line 55.

<Configuration of Pixels>

Figure 3:
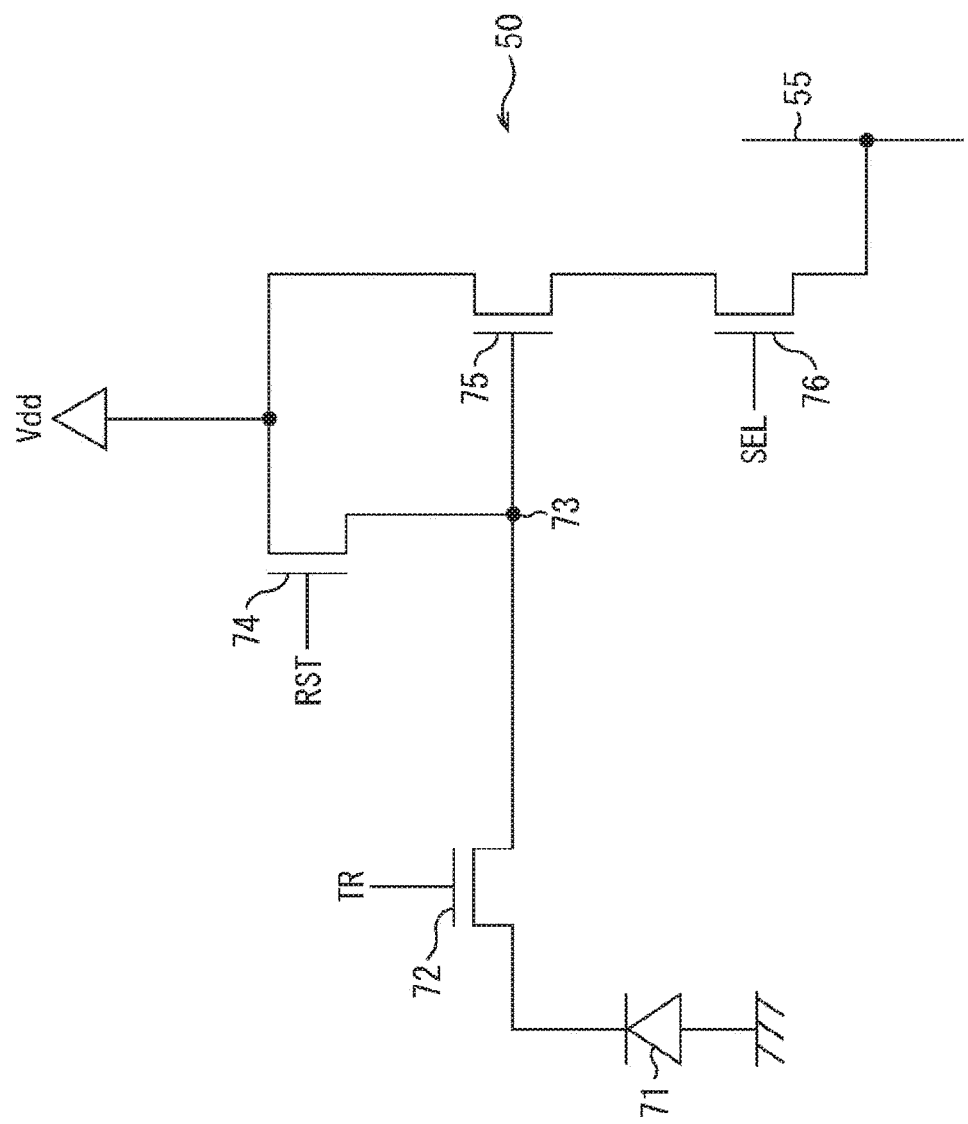
FIG. 3 is a circuit diagram of a pixel.

FIG. 3 is a circuit diagram of the pixel 50 arranged in the pixel array unit 51 (FIG. 2).

The pixel 50 includes a photodiode (PD) 71, a transfer transistor 72, a floating diffusion (FD) 73, a reset transistor 74, an amplification transistor 75, and a selection transistor 76.

The PD 71 functions as a photoelectric conversion device that generates and accumulates an electric charge (signal charge) in accordance with the quantity of received light. The PD 71 has its anode terminal grounded and its cathode terminal connected to the FD 73 via the transfer transistor 72.

When turned on by a transfer signal TR, the transfer transistor 72 reads the electric charge generated by the PD 71 and transfers it to the FD 73. The FD 73 holds the electric charge read from the PD 71. When turned on by a reset signal RST, the reset transistor 74 resets the potential of the FD 73 by discharging the electric charge accumulated in the FD 73 to a drain (constant voltage source Vdd).

The amplification transistor 75 outputs a pixel signal in accordance with the potential of the FD 73. That is, the amplification transistor 75 constitutes a source follower circuit with a load MOS (not shown) as a constant current source connected via the vertical signal line 55, and a pixel signal indicating a level in accordance with the electric charge accumulated in the FD 73 is output from the amplification transistor 75 to the reading unit 53 (FIG. 2) via the selection transistor 76 and the vertical signal line 55.

When the pixel 50 is selected by a selection signal SEL, the selection transistor 76 is turned on and outputs the pixel signal of the pixel 50 to the reading unit 53 via the vertical signal line 55. Each signal line to which the transfer signal TR, the selection signal SEL, and the reset signal RST are transmitted corresponds to the control line 54 in FIG. 2.

The pixel 50 can be configured as described above, but is not limited to this configuration, and other configurations can be adopted.

<Configuration of Reading Unit>

Figure 4:
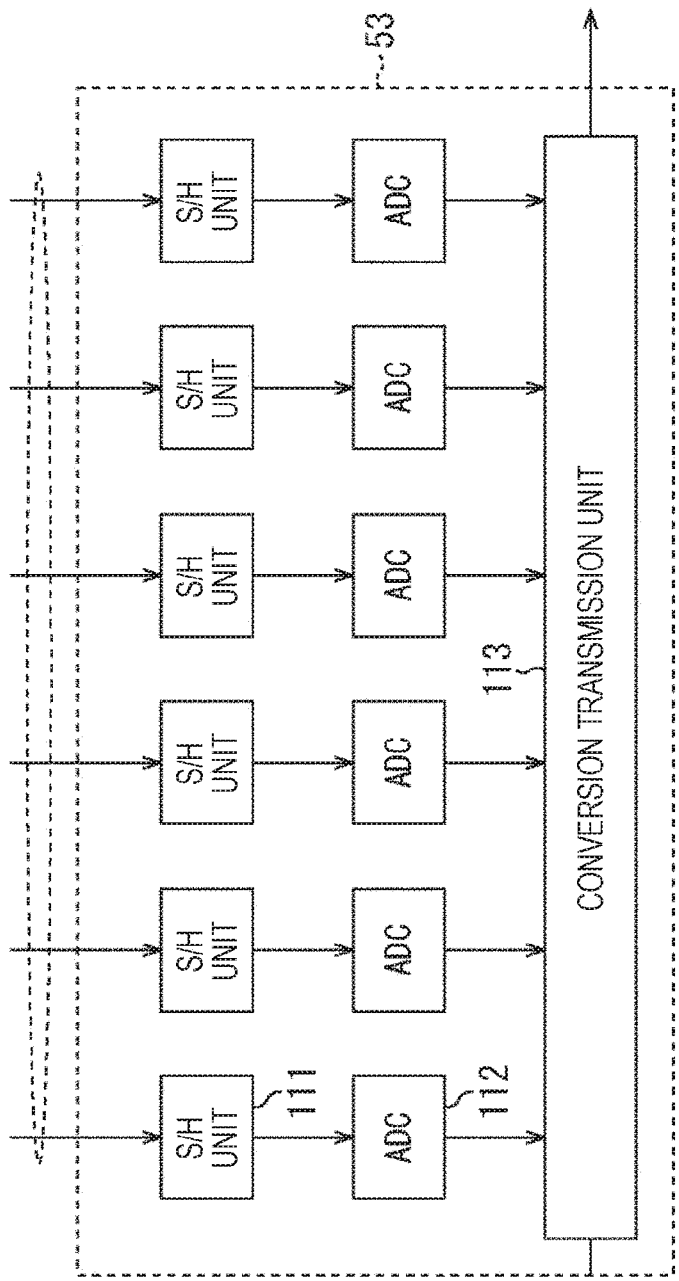
FIG. 4 is a diagram showing a configuration example of a reading unit.

FIG. 4 is a diagram showing a configuration example of the reading unit 53. The reading unit 53 includes a sample-hold unit (S/H unit) 111, an analog digital converter (ADC) 112, and a conversion transmission unit 113.

The S/H unit 111 and the ADC 112 are provided for each vertical signal line 55 (FIG. 3). The S/H unit 111 has a function of sampling and holding the photoelectric conversion amount of the pixel 50 as a sample. The signal held by the S/H unit 111 is supplied to the ADC 112. The signal supplied to the ADC 112 is an analog signal, and the ADC 112 converts the supplied analog signal into a digital signal.

The signal converted into a digital signal by the ADC 112 (hereinafter, described as a pixel value as appropriate) is supplied to the conversion transmission unit 113. The conversion transmission unit 113 has a function of converting parallel data into serial data and transmitting the serial data to the signal processing unit (not shown) in the subsequent stage. Since the pixel values are respectively supplied from the plurality of ADCs 112 to the conversion transmission unit 113, the plurality of pixel values is converted into serial data and output.

<Configuration of S/H Unit>

Figure 5:
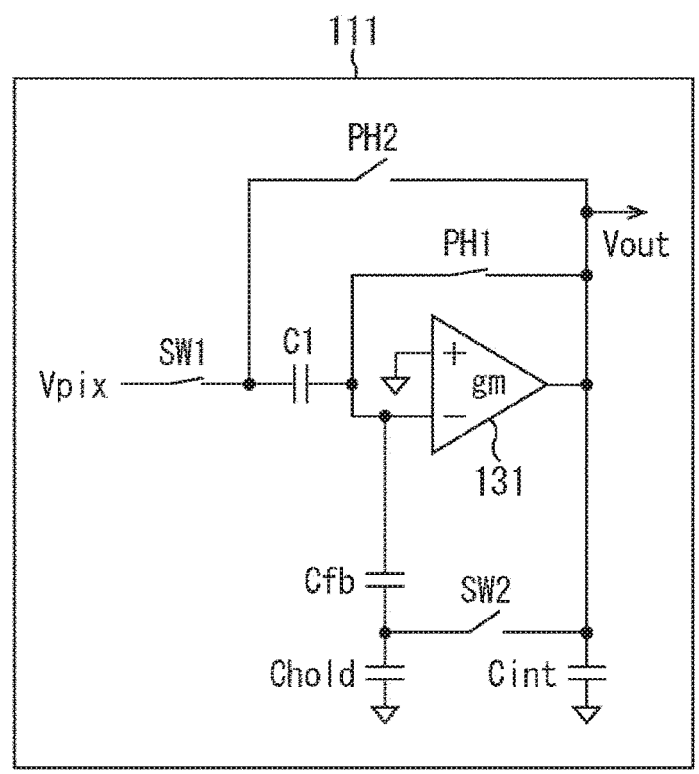
FIG. 5 is a diagram showing a configuration example of a sample-hold (S/H) unit.

FIG. 5 is a diagram showing a configuration example of the S/H unit 111. The S/H unit 111 shown in FIG. 5 includes a circuit that performs sampling and holding (hereinafter, described as an S/H circuit as appropriate) and a portion that cancels generated noise (hereinafter, described as a cancellation circuit as appropriate).

The S/H circuit includes an operational amplifier 131, a switch SW1, a switch PH1, a switch PH2, and a capacitor C1. The cancellation circuit includes a capacitor Cint, a capacitor Chold, a capacitor Cfb, and a switch SW2.

The S/H circuit has the capacitor C1 whose one end is connected to an inversion input terminal IN (−, in the figure) of the operational amplifier 131. The potential of one end of the capacitor C1 can be set to a potential V of an output terminal Vout of the operational amplifier 131 by turning on (closing) the switch PH1. When the switch SW1 is turned on in a state where the switch PH1 is turned on and the other end of the capacitor C1 is connected to an input terminal VIN (Vpix, in the figure) of the sampling voltage, the capacitor C1 is charged with an electric charge in accordance with the input potential to Vin.

When the switches PH1 and SW1 are turned off at a sampling time tS, the capacitor C1 holds the electric charge having been charged, and the potential at the other end of the capacitor C1 is held at an input potential VH at the time tS. The potential VH at the other end of the capacitor C1 is taken out as the output value of the output Vout by turning on the switch PH2.

When such sampling and holding are performed, noise called kTC noise may be generated, which may cause an error in the output value. Then, in order to reduce such noise, the S/H unit 111 shown in FIG. 5 has a cancellation circuit. The cancellation circuit is configured to integrate the generated noise with the capacitor Cint for a certain period of time, and to feed back the result integrated with the capacitor Cint in a direction of turning on the switch SW2 for a short period of time and of canceling the noise of the sample capacitance.

The operation of the S/H unit 111 including the cancellation circuit will be described below with reference to FIGS. 6 to 11. FIGS. 6 to 11 show a timing chart in the left figures, and show a state of the S/H unit 111 at a predetermined timing in the right figures.

In addition, the upper part of the timing chart shows processing of one cycle in the S/H unit 111, and the lower part of the timing chart shows a state of the input voltage and the output voltage of the operational amplifier 131 at a predetermined timing. In addition, the timing chart for one cycle shown in the upper part illustrates a chart common in FIGS. 6 to 11.

Figure 6:
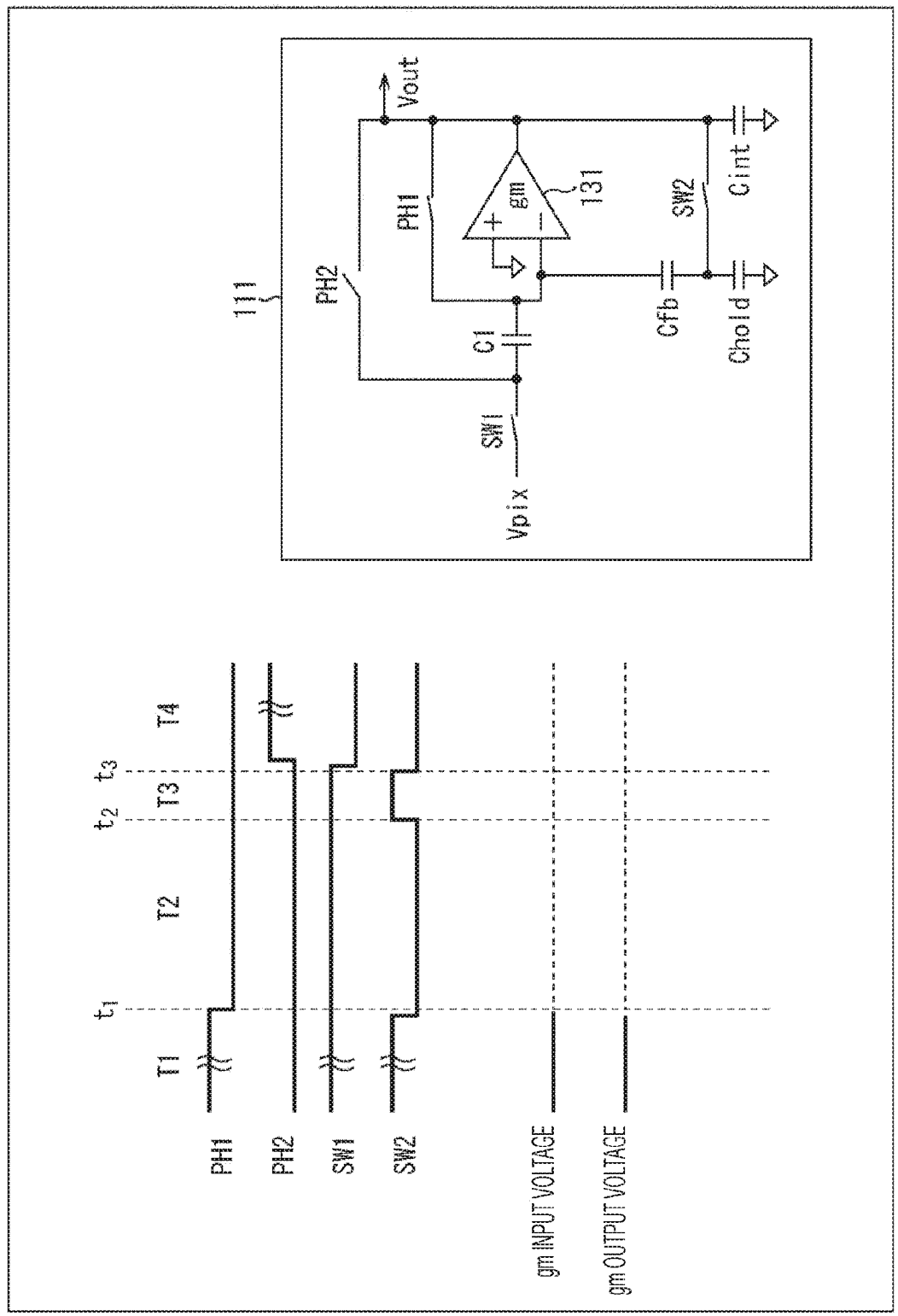
FIG. 6 is a diagram for explaining the operation of the S/H unit.

FIG. 6 shows a state of the S/H unit 111 in a period T1 in which each device in the S/H unit 111 is initialized. In the period T1, the switch PH1 is on, the switch PH2 is off, the switch SW1 is on, and the switch SW2 is on.

In the period T1, since the switch SW1 is in the on state (closed state), the pixel output value Vpix from the pixel 50 is in a state of being accumulated in the capacitor C1. The pixel output value Vpix is sampled at a ground reference (hereinafter, GND reference) with the sample capacitance of the capacitor C1. The GND reference means that since the terminal of the + side of the operational amplifier 131 is grounded (earthed), the ground is used as a reference.

The input value to be input to the − terminal of the operational amplifier 131 is referred to as a gm input voltage. In addition, the output value from the operational amplifier 131 is represented as a gm output voltage. In the period T1, the gm input voltage and the gm output voltage are set to the GND reference.

Figure 7:
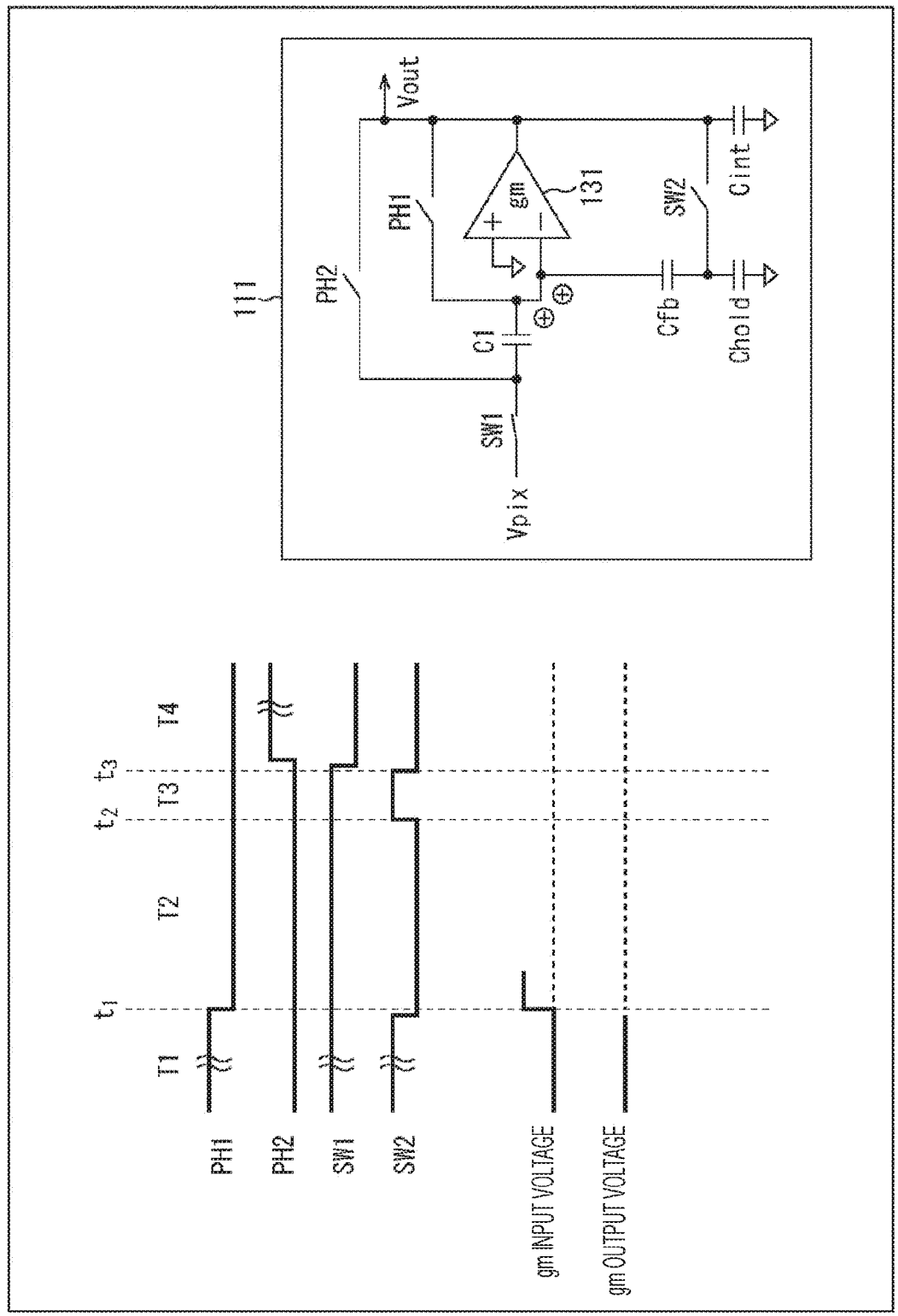
FIG. 7 is a diagram for explaining the operation of the S/H unit.

At a time t1, both the switch PH1 and the switch SW2 are in the off state. The state at this time is shown in FIG. 7. A period from the time t1 to a time t2 is referred to as a period T2. The state of each switch in this period T2 is a state in which the switch PH1 is off, the switch PH2 is off, the switch SW1 is on, and the switch SW2 is off.

At the time t1, when the switch PH1 is turned off with the switch SW1 being in the on state, kTC noise is generated from the moment when the switch PH1 is turned off. In the right figure of FIG. 7, a noise electric charge is generated between the − end of the operational amplifier 131 and the capacitor C1 (between a capacitor Cfb and the capacitor C1). This noise electric charge is a positive electric charge.

Due to generation of the electric charge of the noise, the gm input voltage to the operational amplifier 131 is stabilized at a value shifted from the GND reference. As shown in the lower left figure of FIG. 7, the gm input voltage is stabilized at a value shifted upward from the GND reference.

Figure 8:
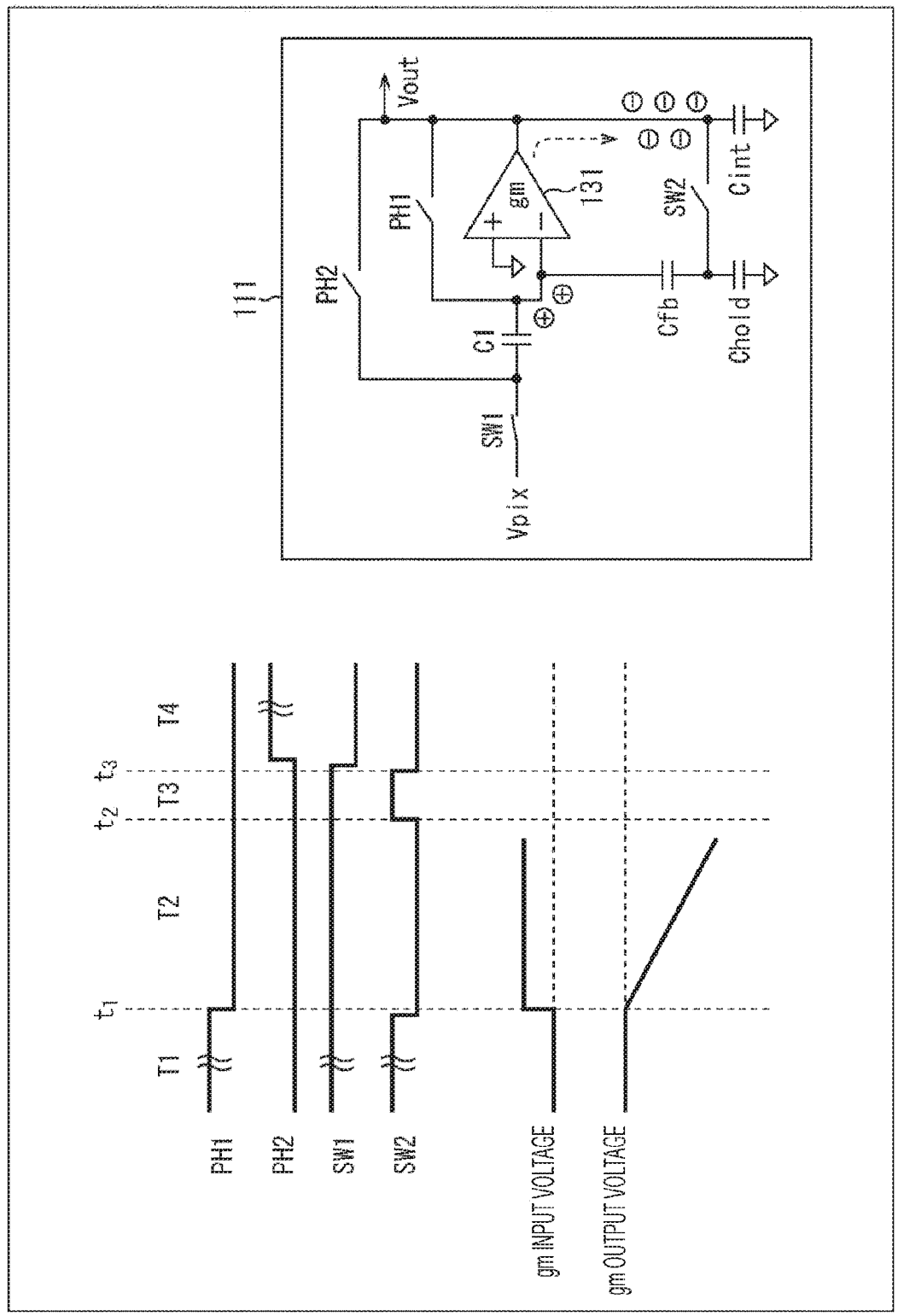
FIG. 8 is a diagram for explaining the operation of the S/H unit.

At and after the time t1 (period T2), the gm output voltage also changes. With reference to FIG. 8, a change in the gm output voltage in the period T2 will be described. In the period T2, the switch PH1 is in the off state (opened state) and in an open loop state, and hence the gm input voltage of the operational amplifier 131 is stabilized at a value shifted upward from the GND reference as described with reference to FIG. 7.

When the gm input voltage becomes a value higher than the GND reference, a negative electric charge flows into the capacitor Cint, and the gm output voltage gradually decreases. The capacitance of the capacitor Cint is designed to be large so that the gm output voltage changes linearly.

In the period T2, a change occurs in which the noise generated in the capacitor C1 is amplified and integrated in the capacitor Cint. That is, the capacitor Cint accumulates an electric charge corresponding to variation of the output voltage of the S/H circuit due to kTC noise.

Figure 9:
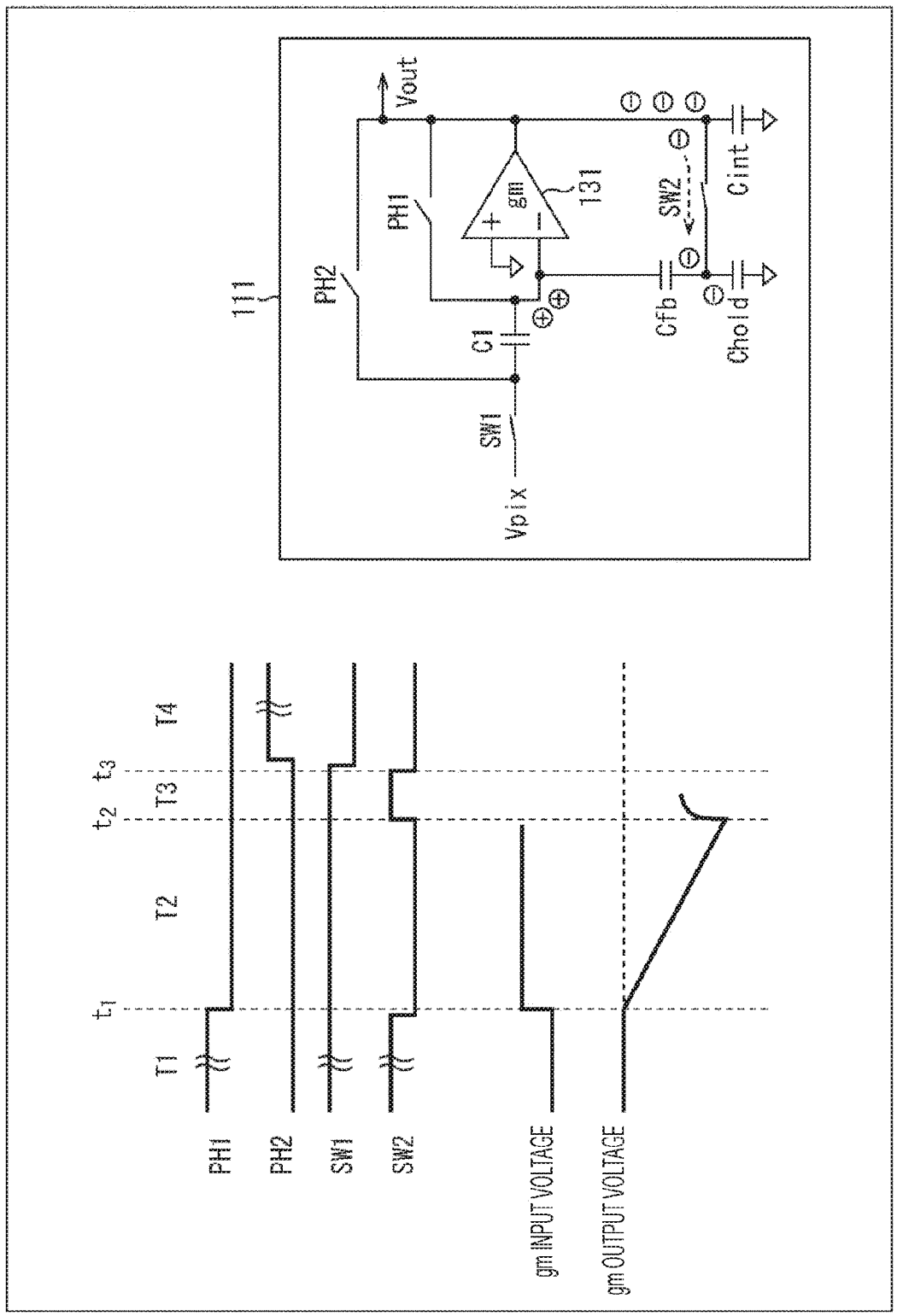
FIG. 9 is a diagram for explaining the operation of the S/H unit.

At the time t2, the switch SW2 is turned on. The state at this time is shown in FIG. 9. The state at the time t2 is that the switch PH1 is off, the switch PH2 is off, the switch SW1 is on, and the switch SW2 is on (state of being switched from off to on).

When the switch SW2 is turned on, the negative electric charge moves from the capacitor Cint to the capacitor Cfb and the capacitor Chold. As the negative electric charge moves, the gm output voltage begins to rise. Thus, while the gm output voltage rises, the gm input voltage starts to fall, as shown in FIG. 10.

Figure 10:
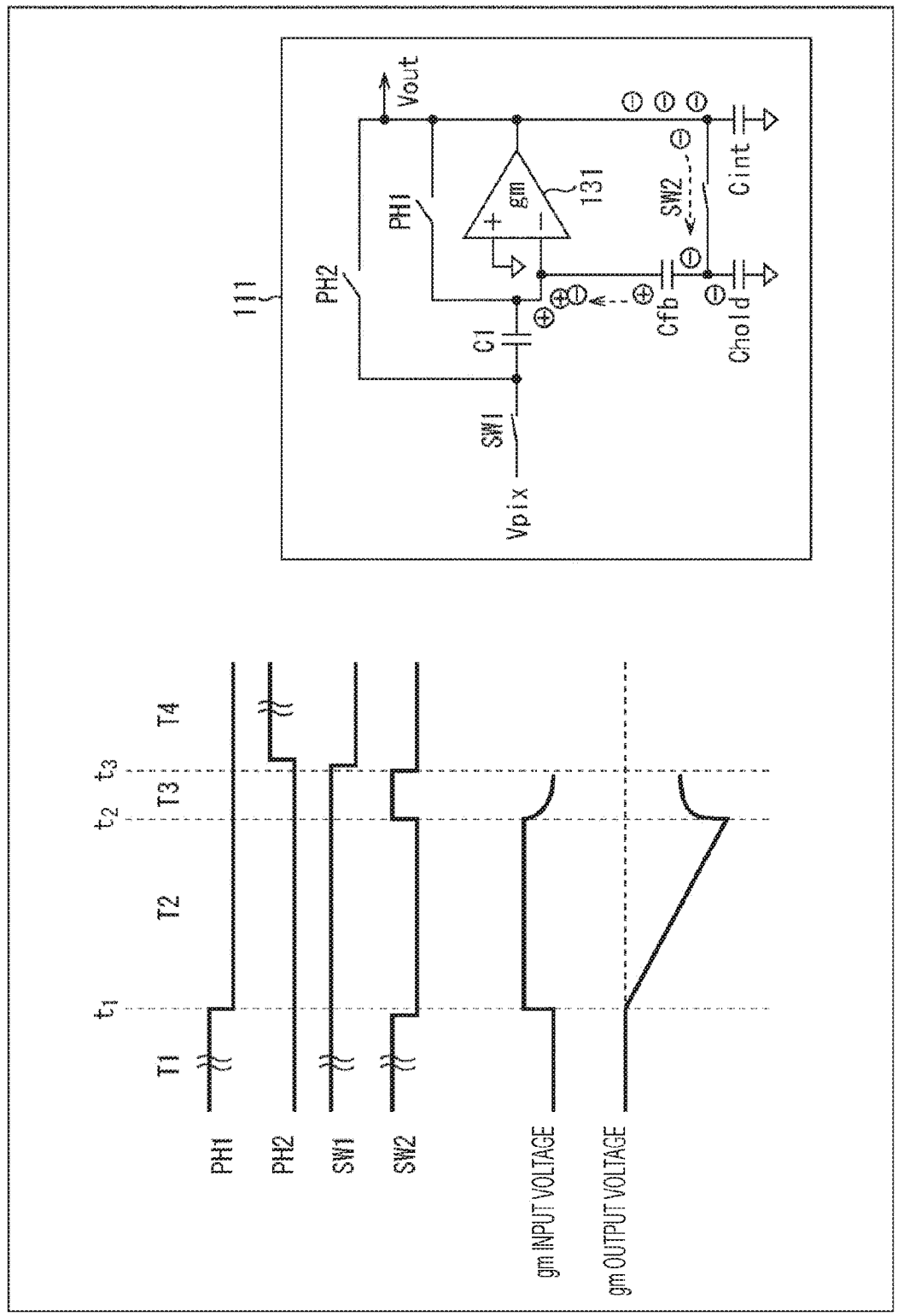
FIG. 10 is a diagram for explaining the operation of the S/H unit.
Figure 11:
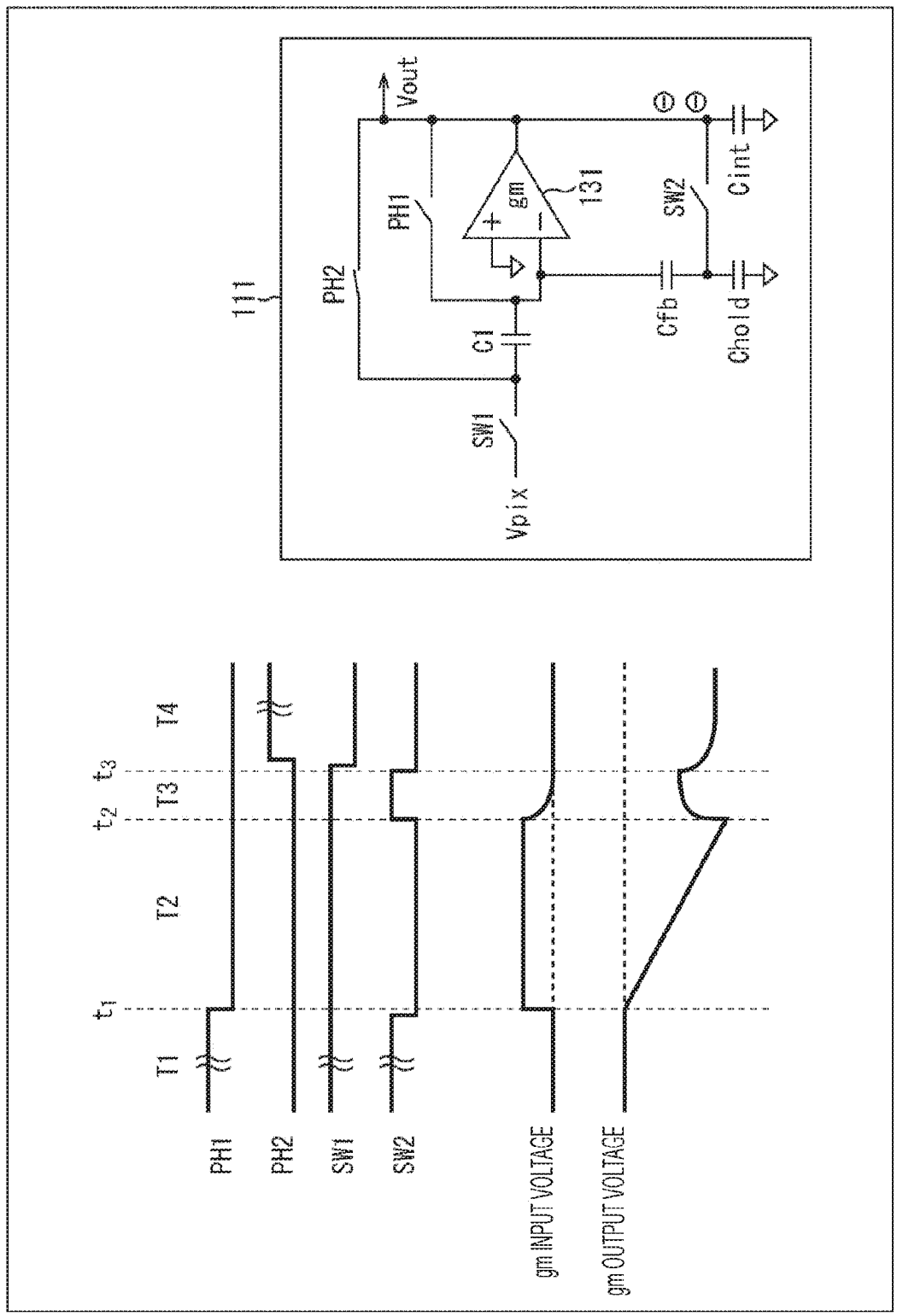
FIG. 11 is a diagram for explaining the operation of the S/H unit.

FIG. 10 is a diagram showing a state in a period T3. The state shown in FIG. 10, similarly to the state shown in FIG. 9, is that the switch PH1 is off, the switch PH2 is off, the switch SW1 is on, and the switch SW2 is on.

The period T3 in which the switch SW2 is on is a short period of time. In this period T3, a negative electric charge moves from the capacitor Cint to the capacitor Cfb, whereby causing a change that both ends (end of the capacitor Cfb connected to the capacitor Chold and the end of the capacitor Cfb connected to the capacitor C1) of the capacitor Cfb have the same electric charge. That is, the capacitor Cfb functions as a capacitor that feeds back, to the operational amplifier 131 side, the electric charge corresponding to the variation of the output voltage of the S/H circuit due to the kTC noise accumulated in the capacitor Cint.

As a result, the positive electric charge of the capacitor Cfb increases and the negative electric charge moves to the capacitor C1. Occurrence of such electric charge movement reduces the positive electric charge in the capacitor C1 generated by the kTC noise. Therefore, as shown in the lower left figure of FIG. 10, the gm input voltage decreases in the period T2 and changes in a direction approaching the GND reference.

That is, when the electric charge moves so as to cancel the deviation from the GND reference, the gm input voltage changes in a direction approaching the GND reference. In other words, the gm input voltage returns to the GND reference.

At the time t3, the switch SW2 is returned to off. The state at and after the time t3 (period T4) will be described with reference to FIG. 11. The state in the period T4 is that the switch PH1 is off, the switch PH2 is on, the switch SW1 is off, and the switch SW2 is off.

At the time t3, the switch SW2 is switched from the on state to the off state. In addition, after the switch SW2 is switched, the switch SW1 is switched from the on state to the off state. Furthermore, after the switch SW1 is switched (when a predetermined period of time has elapsed from the time t3), the switch PH2 is switched from the off state to the on state.

When the switch SW2 is turned off, the gm input voltage returns to the GND reference. Since the switch SW1 is switched from on to off at the time t3, the pixel output Vpix could have been correctly sampled with the GND reference until the time t3. Then, when the switch SW1 is turned off at the time t3, the pixel output Vpix can be held in the capacitor C1 with the GND reference.

Finally, when the switch PH2 is turned on, the voltage at the both ends of the capacitor C1 is in a state of remaining held, and hence the pixel output Vpix held without error is output for the output voltage Vout to be output from the S/H unit 111. That is, the input voltage of the operational amplifier 131 returns to the potential immediately before the switch PH1 is turned from on to off, thereby canceling the kTC noise, charge injection, and clock feedthrough generated by the switching of the switch PH1 from on to off.

Thus, by combining the S/H unit 111 with not only the S/H circuit but also a cancellation circuit, it is possible to obtain an output in which noise or the like is canceled.

However, there is a possibility that the noise cancellation processing by the cancellation circuit fails to accurately cancel the deviation. A configuration of the S/H unit 111 to which a function of optimizing the correction amount is further added in order to further improve the accuracy of noise removal (correction) will be described.

<Configuration with Signal Processing Unit Added>

Figure 12:
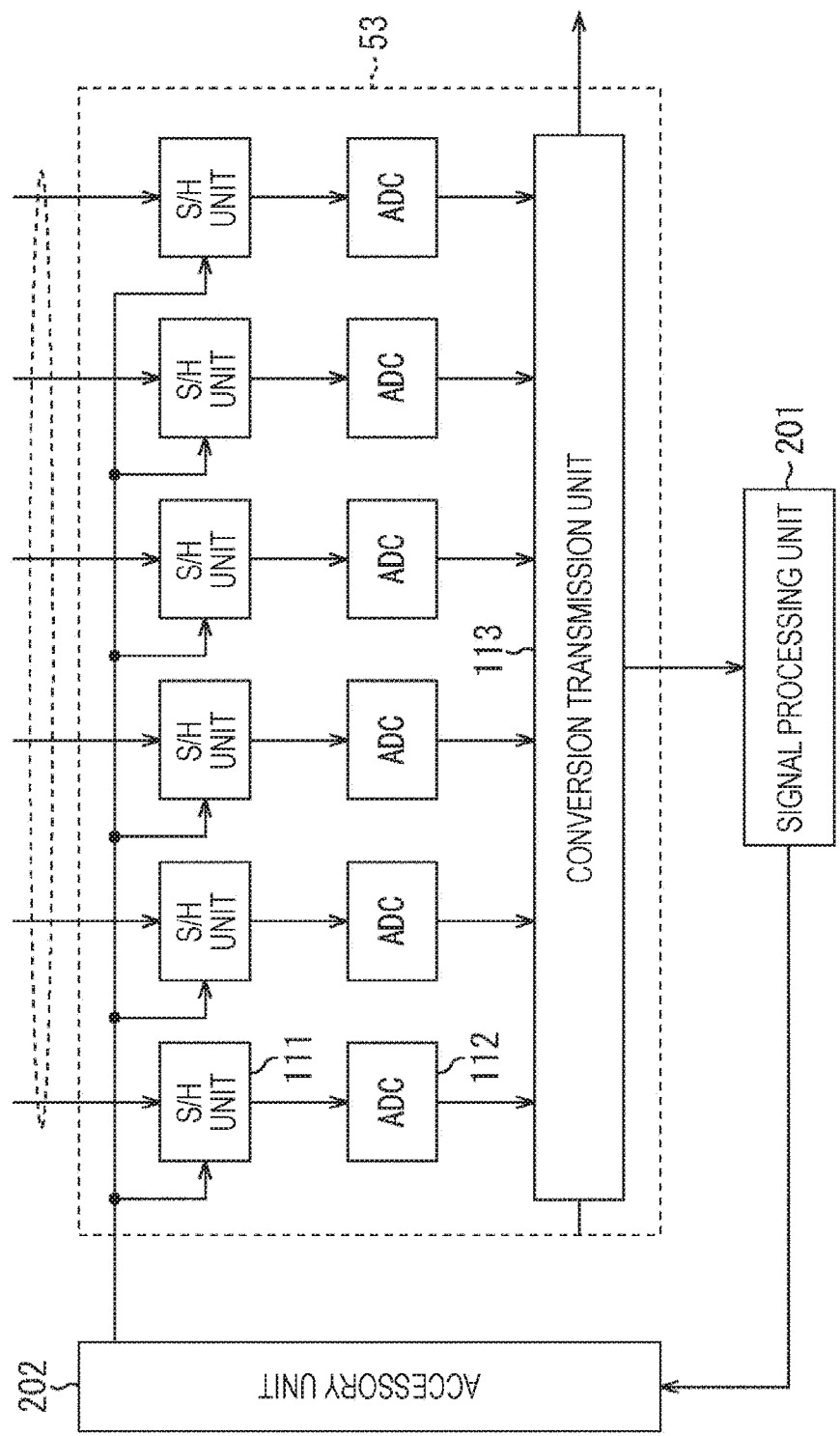
FIG. 12 is a diagram showing a configuration of an embodiment of the reading unit to which the present technology is applied.

FIG. 12 shows a configuration example of the reading unit 53 including a mechanism that cancels noise with higher accuracy. In the configuration example shown in FIG. 12, a signal processing unit 201 that calculates a noise amount using the pixel value read by the reading unit 53 and calculates a set value corresponding to the noise amount is added.

In addition, an accessory unit 202 that performs processing in accordance with the set value calculated by the signal processing unit 201, for example, control of the current value, is added. The accessory unit 202 is connected with each S/H unit 111 by a signal line through which a control signal is output to each S/H unit 111 provided in the reading unit 53. The S/H unit 111 generates a pixel signal by performing processing including processing that reduces noise under the control of the accessory unit 202.

The signal processing unit 201 may be included in the reading unit 53, or may be provided in a portion different from the reading unit 53. In addition, similarly, the accessory unit 202 may be included in the reading unit 53, or may be provided in a portion different from the reading unit 53.

As will be described later with reference to FIG. 13 and thereafter, the data supplied from the reading unit 53 to the signal processing unit 201 is digital data, and hence it is considered that even if the reading unit 53 and the signal processing unit 201 are formed at positions separated from each other, they are less likely to be affected by noise, and they are less affected by the arrangement positions of the reading unit 53 and the signal processing unit 201.

In addition, the accessory unit 202 includes, for example, a variable current source, but has a small number of components and a small number of factors of noise generation.

Therefore, noise is not generated by the newly added signal processing unit 201 and the accessory unit 202, and the noise in the S/H unit 111 can be more accurately canceled by executing the processing described below.

In order to cancel the noise in the S/H unit 111, it is sufficient that an electric charge is generated and subtracted in the cancellation circuit by the generated noise. In a case where such noise cancellation is performed, the S/H unit 111 satisfies the following equation (1).

[Eq. 1]

$$\beta \times \frac{g_m \times T_{int}}{C_{int}} = 1 \quad (1)$$

In the equation (1), β represents a feedback coefficient configured in the capacitor C1, the capacitor Chold, and the capacitor Cfb. In addition, in the equation (1), gm represents the transconductor of the operational amplifier 131, Tint represents a time in which an electric charge is accumulated in the capacitor Cint, which, in the above example, represents a value corresponding to the period T2. In addition, in the equation (1), Cint represents the capacitance (capacitance for current integration) of the capacitor Cint.

By setting β, gm, Tint, and Cint so as to satisfy the equation (1), the noise can be canceled in the S/H unit 111.

The signal processing unit 201 and the accessory unit 202 control the S/H unit 111 so that the S/H unit 111 functions as a setting unit that sets β, gm, Tint, or Cint that can cancel noise with high accuracy and the S/H unit 111 performs sampling and holding on the basis of the setting. Hereinafter, a description will be given with reference to configuration examples of the reading unit 53, the signal processing unit 201, and the accessory unit 202 in the cases of setting β, setting gm, setting Tint, and setting Cint.

<In Case of Performing Adjustment with gm>

Figure 13:
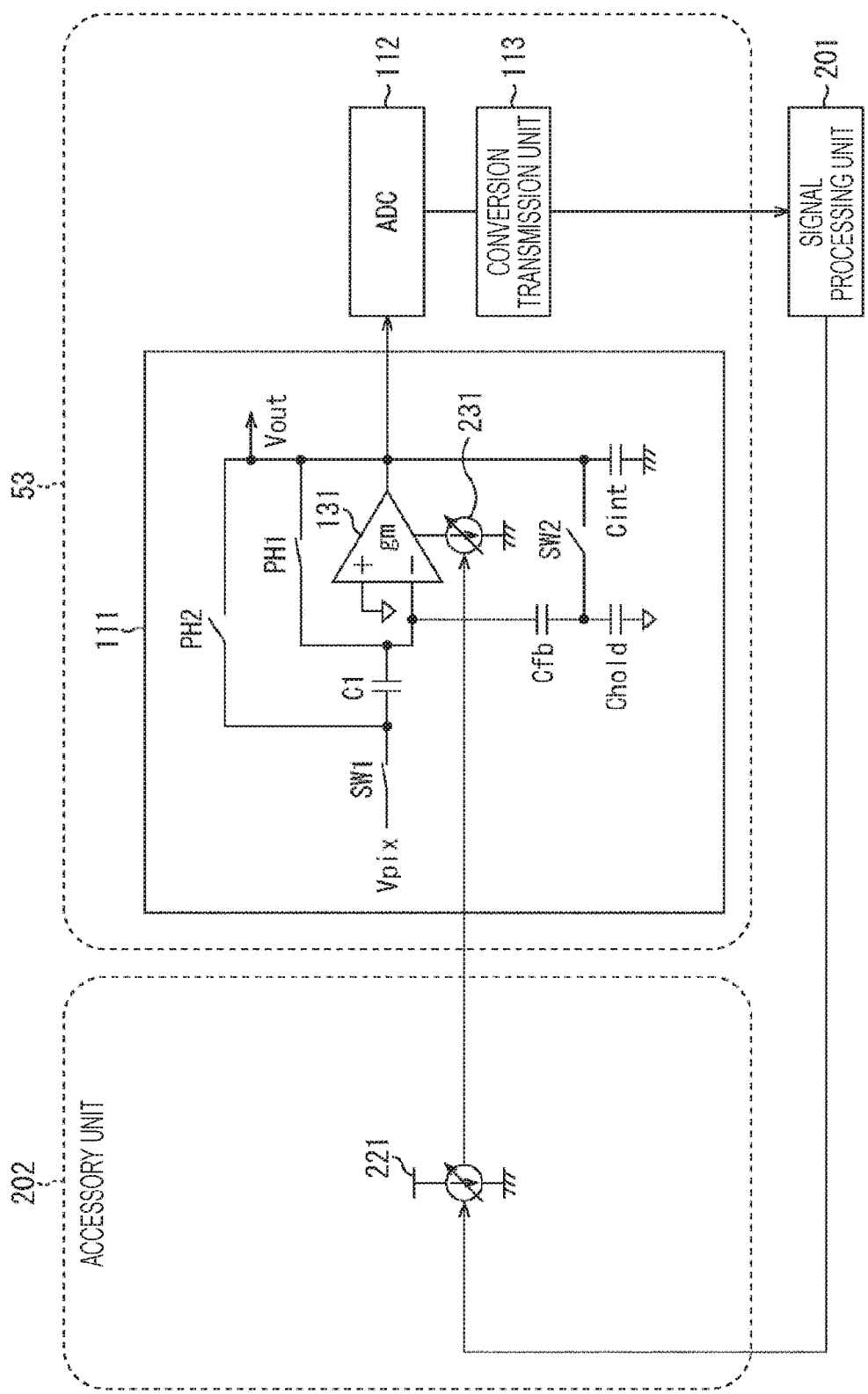
FIG. 13 is a diagram showing a configuration example of the reading unit in a case of performing control with a current value.

FIG. 13 shows a configuration example when noise in the S/H unit 111 is reduced by adjusting the transconductor gm of the operational amplifier 131. FIG. 13 shows the reading unit 53 that performs reading of one column of the pixel array unit 51, and shows one set of the S/H unit 111 and the ADC 112 as an example.

In a case where the performance of cancellation of noise is improved by adjusting the transconductor gm of the operational amplifier 131, a current source connected to the operational amplifier 131 is a variable current source 231, and the current value of the variable current source 231 is controlled (adjusted) by a variable current source 221 in the accessory unit 202. The current to flow the variable current source 221 of the accessory unit 202 is a value set by the signal processing unit 201.

Although the description will now be continued with an example of the case where the variable current source 231 connected to the operational amplifier 131 is controlled by the variable current source 221 in the accessory unit 202, it may be configured such that the variable current source 221 in the accessory unit 202 is not provided and the accessory unit 202 directly controls the variable current source 231 on the basis of the value set by the signal processing unit 201.

In addition, although the description will be continued with an example of the case where the accessory unit 202 controls the variable current source 221 on the basis of a value set by the signal processing unit 201, it may be configured such that the accessory unit 202 is not provided and the signal processing unit 201 directly controls the variable current source 231.

The processing of the signal processing unit 201 will now be described with reference to the flowcharts of FIGS. 15 and 16. It is to be noted that as a premise, as shown in FIG. 14, a case where processing is performed using pixel values of two rows of the pixel array unit 51 will be described as an example.

Figure 14:
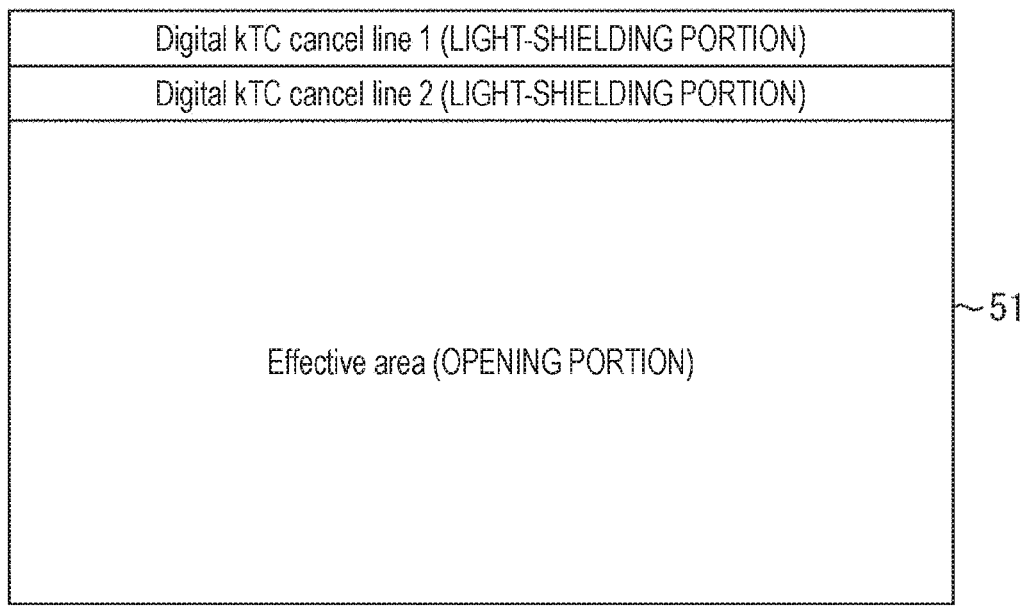
FIG. 14 is a diagram for explaining lines of a pixel array unit used in calculation.

With reference to FIG. 14, the pixels 50 are arranged in an array in the pixel array unit 51. In the pixel array unit 51, a plurality of pixels is arranged in one line, and a plurality of lines in which such pixels are arranged is provided. A predetermined line of the pixel array unit 51, e.g., the first line and the second line positioned upwards in FIG. 14 are shielded from light and do not receive light. The pixel values of these two lines are used to perform processing by the signal processing unit 201.

It is to be noted that a description will be given now with an example of a case where processing is performed by using pixel values for two lines, but it is possible to configure that the processing is performed by using pixel values for one line, for example, or it is possible to configure that the processing is performed by using pixel values for two or more lines. In addition, as shown in FIG. 14, although the description will be continued with an example of the case where processing is performed by using two lines in the upper portion of the pixel array unit 51, the position of these lines is not limited to the two lines in the upper portion, and for example, one line in the upper portion and one line in the lower portion may be each used as a light-shielding line, and the processing may be performed using these two lines.

The processing in the signal processing unit 201 will be described with reference to the flowcharts shown in FIGS. 15 and 16.

In step S11, the initial current adjustment value is set. A plurality of current adjustment values is set in advance in the signal processing unit 201. This current adjustment value is a value itself that is set as the current of the transconductor gm of the S/H unit 111 or a value associated with the current of the transconductor gm. In a case where the current adjustment value is a value associated with the current of the transconductor gm for example, the current adjustment value set by the signal processing unit 201 is supplied to the accessory unit 202, and the accessory unit 202 controls the current of the transconductor gm of the S/H unit 111 so as to become the current of the transconductor gm associated with the supplied current adjustment value.

Here, the description will be continued on an assumption that i current adjustment values have been set. In step S11, one of the i current adjustment values (current adjustment value i1) is set. The current adjustment value i1 set by the signal processing unit 201 is supplied to the accessory unit 202, and the accessory unit 202 starts control so that the current of the transconductor gm of the operational amplifier 131 of the S/H unit 111 becomes the current adjustment value i1 (current value associated with the current adjustment value i1).

In step S12, the signal processing unit 201 inputs the data of the first line from the reading unit 53. The input data is data obtained when the current of the transconductor gm of the operational amplifier 131 of the S/H unit 111 is adjusted by the current adjustment value i1. Here, let the data of the first line be data Xn. n corresponds to the number of pixels arranged in the first line.

In step S13, it is determined whether or not the data input of the first line has been completed. The processing returns to step S12 and the data input of the first line is continued until it is determined in step S13 that the data input of the first line has been completed. It is to be noted that the input data is held in a storage device such as a random access memory (RAM).

On the other hand, if it is determined in step S13 that the data input of the first line has been completed, the processing proceeds to step S14. In step S14, an average value of the data of the first line is calculated. Here, the description will be continued with the average value of the data of the first line to be calculated being an average value Xave.

In step S15, input of the data of the second line is started. Here, let the data of the second line be data X'n. When the data of the second line is input, a difference from the data of the first line is calculated and held in step S16. In step S16, a difference (Xn−X'n) between the data Xn and the data X'n is calculated.

In step S17, it is determined whether or not the data input of the second line has been completed. The processing returns to step S15 and the data input of the second line and the calculation of the difference between the data input of the second line and the data of the first line are continued until it is determined in step S17 that the data input of the second line has been completed.

On the other hand, if it is determined in step S17 that the data input of the second line has been completed, the processing proceeds to step S18. In step S18, an average value of the data of the second line is calculated. Here, the description will be continued with the average value of the data of the second line to be calculated being an average value X'ave.

In step S18, an average difference D is calculated. The average difference D is calculated by calculating the average difference D=average value Xave−average value X'ave.

In step S19 (FIG. 16), difference data (Xn−X'n) is read. Since the difference is calculated and held in step S16, the held difference data is read by the number of pixels arranged in one line.

In step S21, a difference between the difference data having been read and the average difference D calculated in step S19 is calculated, and an absolute value is calculated. That is, |(Xn−X'n)−D| is calculated in step S21.

In step S22, it is determined whether or not the calculation for one line has been completed. If n pixels are arranged in one line, the calculations in step S20 and step S21 are repeated n times.

If it is determined in step S22 that the calculation for one line has been completed, the processing proceeds to step S23, and the data for one loop is held. By performing the processing of steps S11 to S23, an index of noise when one current adjustment value i is set is obtained. In other words, by performing the processing of steps S11 to S23, the generated noise amount when image capturing is performed with the current adjustment value i having been set is measured.

By performing the processing of steps S11 to S23, the calculation based on the following equation (2) is performed.

[Eq. 2]

$$ni(=\text{noise indicator}) = \sum_{n}^{m} |(x_n - x_{ave}) - (x'_n - x'_{ave})| \qquad (2)$$

In equation (2), Xn is a pixel value read from a predetermined pixel on the first line, and Xave is an average value of the pixel values on the first line. In equation (2), X'n is a pixel value read from a predetermined pixel on the second line, and X'ave is an average value of the pixel values on the second line.

The result of the calculation by the equation (2) becomes a small value when the noise is small, and becomes a large value when the noise is large. Therefore, it can be used as an index of noise. Here, it is represented as a noise index n, and the noise index n obtained at the current adjustment value i is represented as a noise index ni.

Since the noise index ni is calculated for each current adjustment value i, in a case where, for example, ten current adjustment values i are set, the processing of steps S12 to S23 are repeated ten times to calculate ten noise indices ni.

Figure 16:
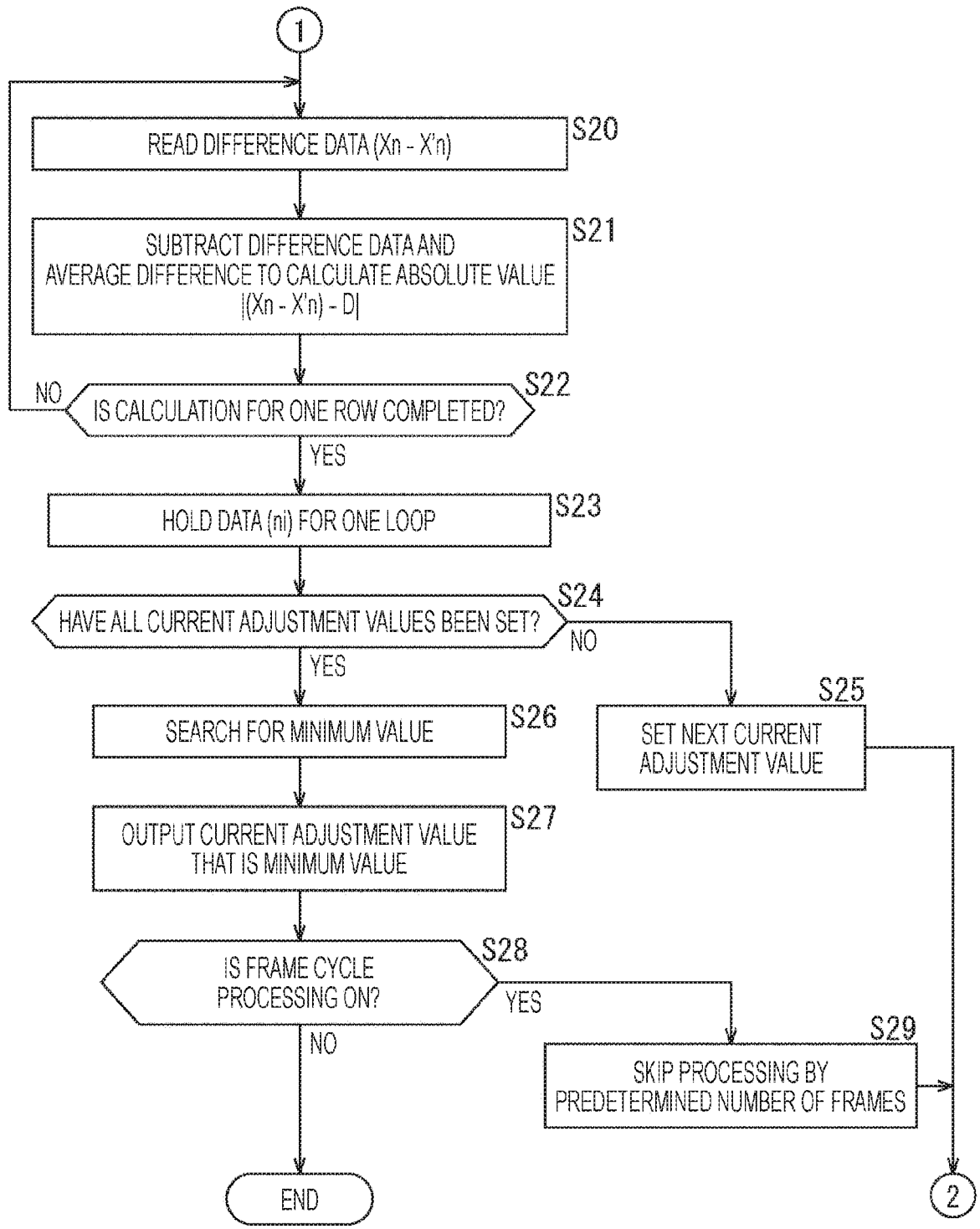
FIG. 16 is a flowchart for explaining the operation of the signal processing unit.

Returning to the description of the flowchart of FIG. 16, when data for one loop is held in step S23, the processing proceeds to step S24, where it is determined whether or not all current adjustment values have been set and a noise index has been calculated.

If it is determined in step S24 that there is a current adjustment value i that has not yet been set, the processing proceeds to step S25. In step S25, the current adjustment value is set to a current adjustment value i that is set next to the current adjustment value i that has been set at that time. With this newly set current adjustment value i, the processing in and after step S12 (FIG. 15) is performed.

On the other hand, if it is determined in step S24 that all the current adjustment values i have been set, the processing proceeds to step S26. In step S26, the minimum value is searched. By the processing up to step S25, the noise index value ni when each of the plurality of current adjustment values i is set is calculated. The minimum value of the noise index values ni is searched.

Figure 17:
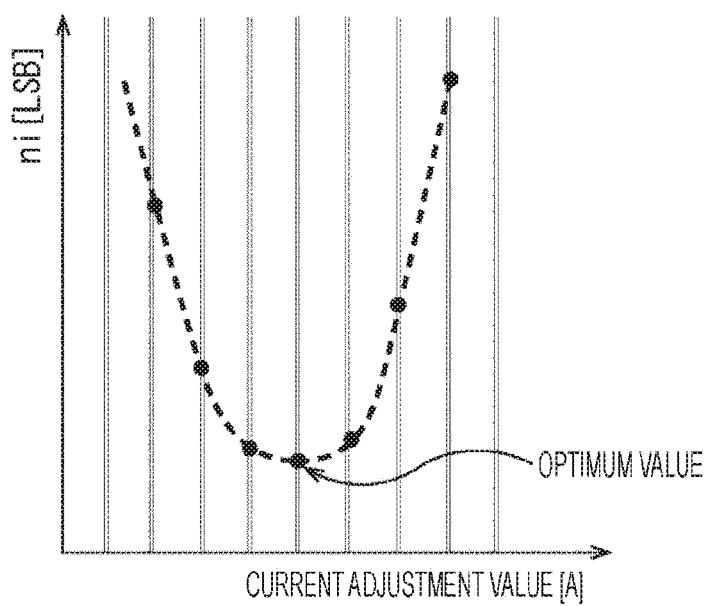
FIG. 17 is a graph for explaining how to determine an optimum value.

FIG. 17 shows an example of a case where the noise index value ni obtained in the processing up to step S25, for example, is represented by a graph. In the graph shown in FIG. 17, the vertical axis represents the noise index value ni, and the horizontal axis represents the current adjustment value i. In a case where a quadratic function graph as shown in FIG. 17 is obtained, the current adjustment value i at which the noise index value ni becomes the minimum value (value indicated as optimum value in the figure) is searched in step S26.

It is to be noted that the graph shown in FIG. 17 is an example, and there is a case where a graph that increases or decreases linearly, for example, is obtained. In addition, the graph as shown in FIG. 17 is shown as an example representing a relationship between the noise index value ni and the current adjustment value i, and it is not necessary to draw a graph when the processing in step S26 is executed, and it is only required to search the current adjustment value i at which the noise index value ni becomes the minimum value.

Thus, the current adjustment value i is set. By adjusting the current of the transconductance gm of the operational amplifier 131 with the current adjustment value i, the processing in the S/H unit 111 with suppressed noise can be executed.

It is to be noted that the description is given now with an example of the case where the processing in steps S12 to S25 is repeated by the number of the current adjustment values i having been preset and the noise index ni is calculated, but it may be configured such that, for example, when the noise index ni is calculated in the processing in step S23 and the value of the noise index ni becomes 0 or a value close to 0 (equal to or less than a predetermined threshold value), the processing is ended, and the current adjustment value i set at that time is set as the current adjustment value i used at the time of imaging.

Returning to the processing of the flowchart of FIG. 16, when the current adjustment value that becomes the minimum value is set in step S27, the processing proceeds to step S28. In step S28, it is determined whether or not frame cycle processing is turned on.

For example, when a moving image is being captured, it is only required that setting of the current adjustment value is not performed for each frame but is performed for every several frames. A mode in which setting of the current adjustment value is performed for every several frames and a mode in which setting of the current adjustment value is performed for each frame may be settable to the user, or some condition may be set and the mode may be switched when the condition is satisfied.

In addition, for example, the frame cycle processing may be turned on when a moving image is being captured, and the frame cycle processing may be turned off when a still image is being captured.

If it is determined in step S28 that the frame cycle processing is on, the processing proceeds to step S29. In step S29, the processing is skipped by a predetermined number of frames, and after the skip ends, the processing returns to step S12 (FIG. 15), and the processing in step S12 and subsequent steps is repeated.

Figure 15:
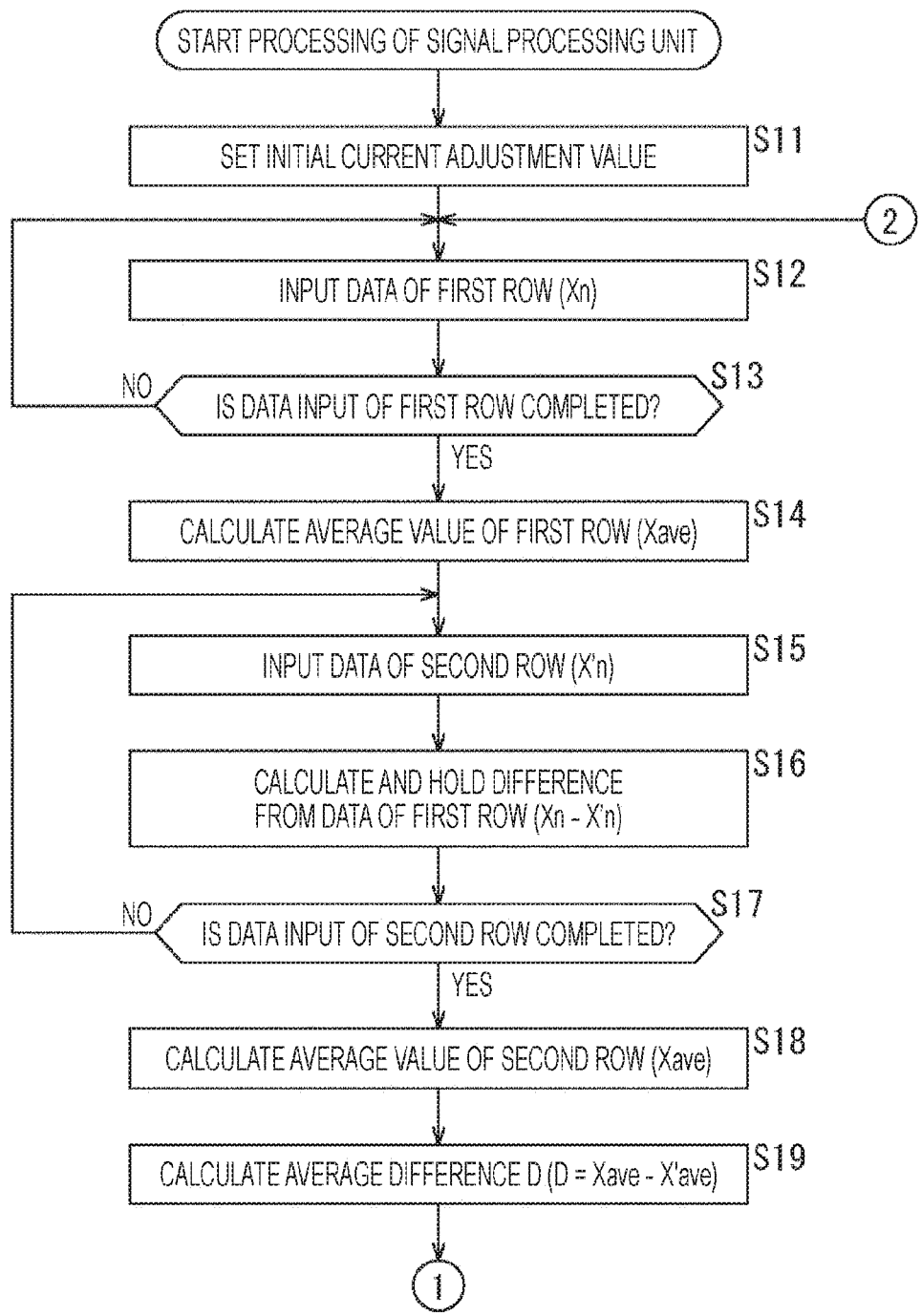
FIG. 15 is a flowchart for explaining the operation of a signal processing unit.

On the other hand, if it is determined in step S28 that the frame cycle processing is not turned on, the processing based on the flowcharts shown in FIGS. 15 and 16 is ended.

Thus, the signal processing unit 201 sequentially switches a plurality of preset current adjustment values, measures noise at the set current adjustment value, and calculates the current adjustment value at which noise is minimized. Since the current value of the operational amplifier 131 in the S/H unit 111 is controlled with this calculated current adjustment value, it is possible to execute processing in which noise such as kTC noise is reduced.

It is to be noted that as shown in FIG. 5, the S/H unit 111 has the cancellation circuit for canceling noise. Noise can be canceled by this cancellation circuit, and moreover, setting the current adjustment value as described above makes it possible to perform fine adjustment for further suppressing the noise. In addition, although the noise generation amount may change depending on the usage environment such as temperature and humidity, executing the above processing make it possible to perform noise cancellation processing corresponding to a change in the noise amount due to a change in such usage environment.

It is to be noted that as shown in FIG. 5, the S/H unit 111 has the cancellation circuit for canceling noise, but in the configuration of the reading unit 53 shown in FIG. 13 including the S/H unit 111 shown in FIG. 5, the transconductor gm of the operational amplifier 131 is adjusted as described above, and hence the present technology can be applied to a configuration of the S/H unit 111 not including the cancellation circuit.

In other words, in a case where the kTC noise generated in the S/H unit 111 is reduced by adjusting the transconductor gm of the operational amplifier 131, the present technology can be applied even to the S/H unit 111 including only the S/H circuit. Also in this case, the kTC noise generated in the S/H circuit can be reduced by adjusting the transconductor gm of the operational amplifier 131.

<Case of Performing Adjustment with Capacitance Value of Capacitor Cint>

As described above, the adjustment for canceling noise is only required to set each item so as to satisfy the equation (1), and first, in the above example, the case where the transconductor gm of the operational amplifier 131 is adjusted has been described. Next, a case where noise is further reduced by adjusting the capacitance value of the capacitor Cint included in the S/H unit 111 will be described.

Figure 18:
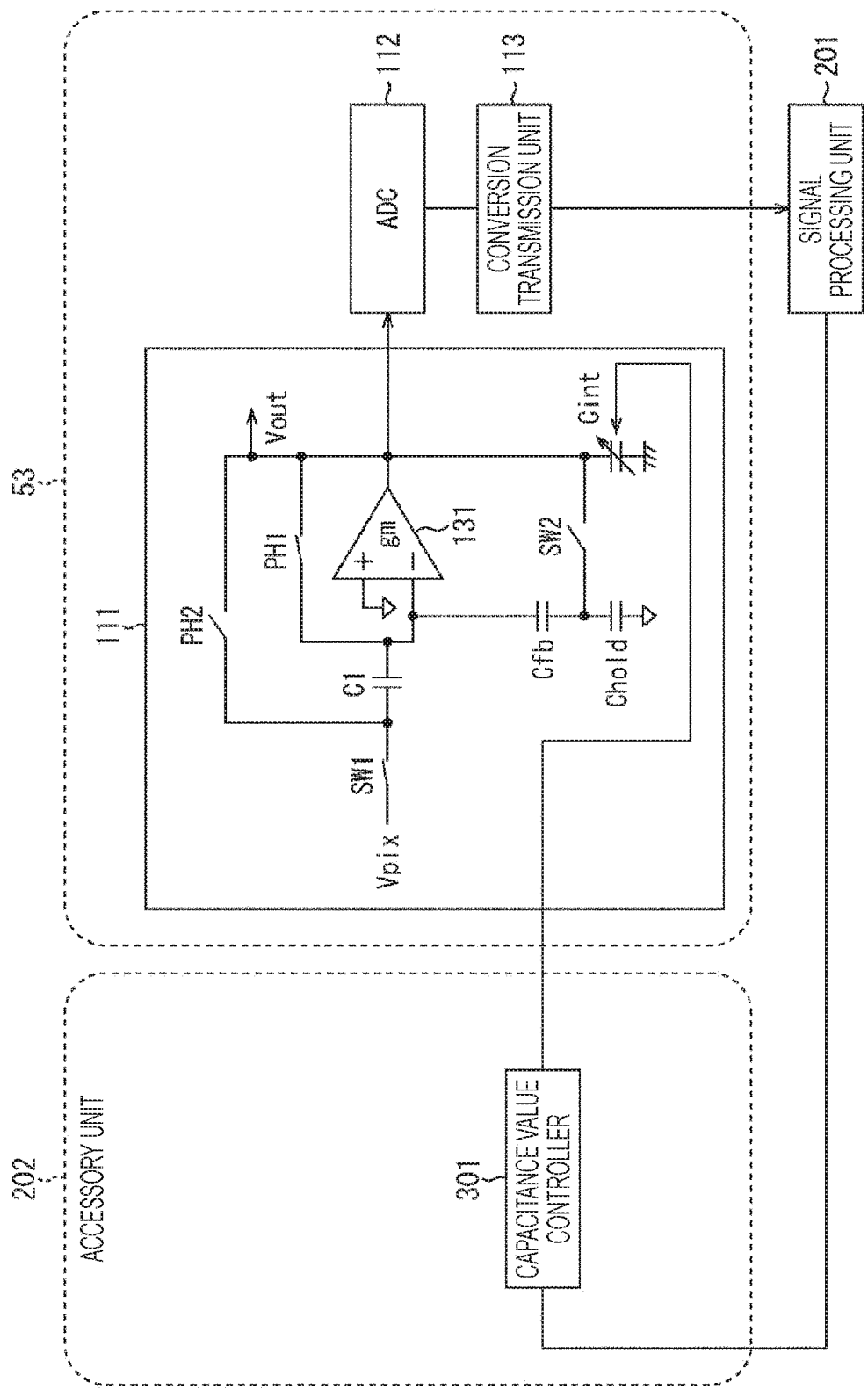
FIG. 18 is a diagram showing another configuration example of the S/H unit.

FIG. 18 is a diagram showing a configuration example when noise of the S/H unit 111 is reduced by adjusting the capacitance value (capacitance for current integration) of the capacitor Cint of the operational amplifier 131.

In a case where the performance of cancellation of noise is improved by adjusting the capacitance value (capacitance for current integration) of the capacitor Cint of the operational amplifier 131, the capacitor Cint includes a capacitor of variable capacitance, and the variable capacitance is controlled (adjusted) by a capacitance value controller 301 of the accessory unit 202.

The accessory unit 202 includes the capacitance value controller 301, and adjusts the capacitance of the capacitor Cint to a value set by the signal processing unit 201.

Although the description will now be continued with an example of the case where the capacitance value controller 301 in the accessory unit 202 controls the capacitance of the capacitor Cint, it may be configured that the accessory unit 202 is not provided and the signal processing unit 201 directly controls the capacitance of the capacitor Cint.

Since the signal processing unit 201 in the configuration shown in FIG. 18 performs processing on the basis of the flowcharts shown in FIGS. 15 and 16, description thereof will be omitted. In the above description, the processing of the signal processing unit 201 shown in FIG. 18 can be performed by replacing the current adjustment value with the capacitance value.

In this case, the signal processing unit 201 sets one capacitance value of a plurality of preset capacitance values, and the capacitance value controller 301 of the accessory unit 202 controls the capacitance of the capacitor Cint in the S/H unit 111 so as to attain the capacitance value set by the signal processing unit 201.

The pixel value thus controlled is used to calculate the noise index value ni. Such the noise index value ni is calculated for each of the plurality of preset capacitance values, and the capacitance value at which the minimum noise index value ni is obtained is searched. Since the capacitance of the capacitor Cint of the operational amplifier 131 is controlled with the capacitance value searched in this manner, it is possible to execute processing in which noise such as kTC noise is reduced.

Thus, also in a case where the capacitance value of the capacitor Cint is adjusted, noise can be canceled by the cancellation circuit included in the S/H unit 111, and moreover, setting the capacitance value as described above makes it possible to perform fine adjustment for further suppressing the noise. In addition, although the noise generation amount may change depending on the usage environment such as temperature and humidity, executing the above processing make it possible to perform noise cancellation processing corresponding to a change in the noise amount due to a change in such usage environment.

<Case of Performing Adjustment with Feedback Coefficient β>

Next, a case where noise is further reduced by adjusting the feedback coefficient β of the capacitor Cfb included in the S/H unit 111 will be described.

Figure 19:
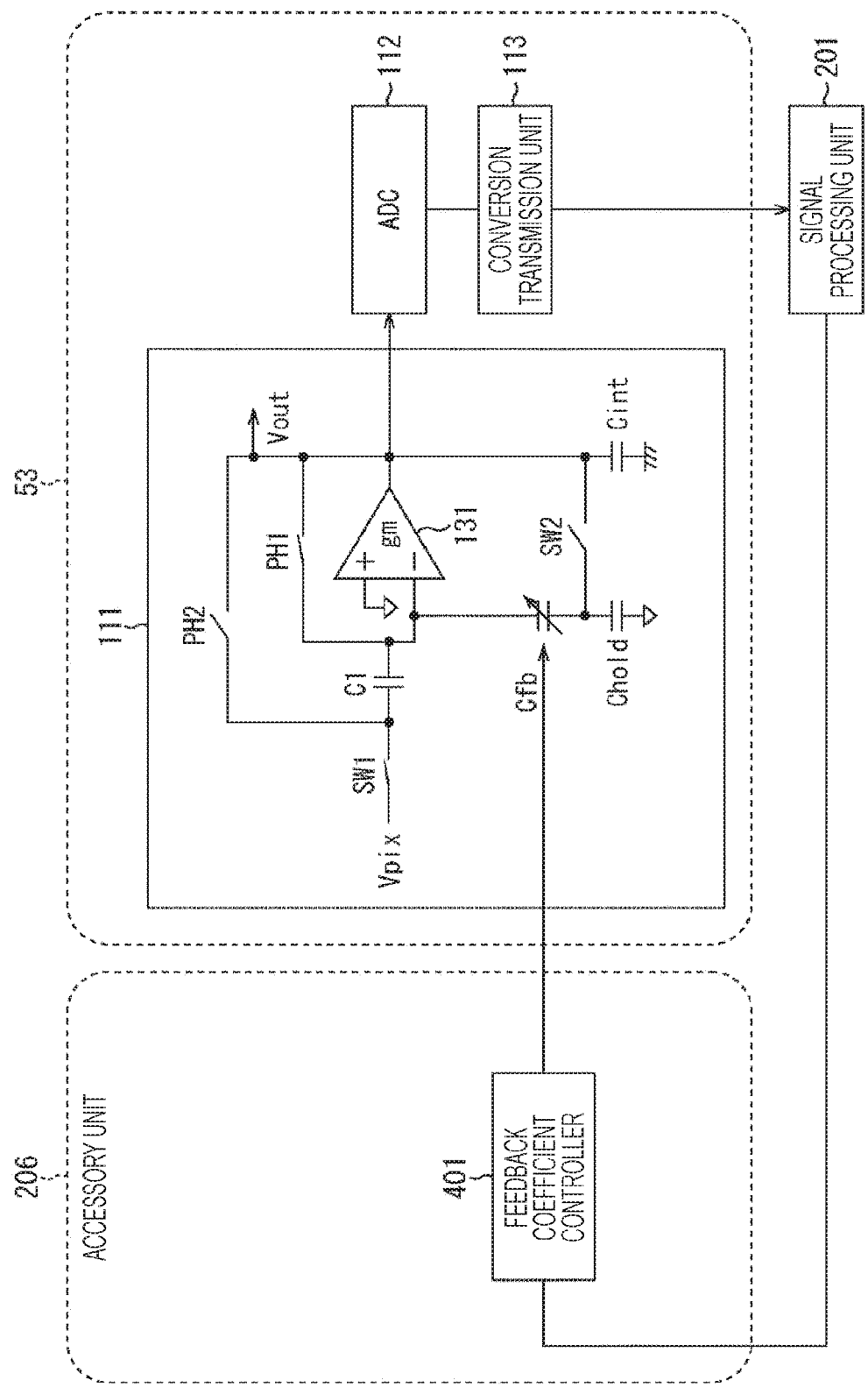
FIG. 19 is a diagram showing another configuration example of the S/H unit.

FIG. 19 is a diagram showing a configuration example when noise of the S/H unit 111 is reduced by adjusting the feedback coefficient β of the capacitor Cfb of the operational amplifier 131.

The feedback coefficient β is a value satisfying the following equation.

$$\beta = Cfb/(C1+Cfb)$$

In this equation, Cfb represents the capacitance of the capacitor Cfb, and C1 represents the capacitance of the capacitor C1.

This equation indicates that the feedback coefficient β is a value set by the capacitance of the capacitor Cfb in a case where the capacitance of the capacitor C1 is fixed. Then, a description will now be given with an example of a case where noise of the S/H unit 111 is reduced by adjusting the feedback coefficient β, in other words, by adjusting the capacitance of the capacitor Cfb.

In addition, in general, in a case where a negative feedback configuration is applied to the operational amplifier, the noise reduction processing is performed by multiplying the output from the operational amplifier by a predetermined coefficient and returning it to the input side, and the feedback coefficient β is related to the predetermined coefficient at this time. Therefore, the representation of feedback coefficient β is used in the sense of a coefficient related to feedback and a value for adjusting the capacitance of the capacitor Cfb.

In a case where the performance of cancellation of noise is improved by adjusting the feedback coefficient β of the capacitor Cfb of the operational amplifier 131, the capacitor Cfb includes a capacitor of variable capacitance, and the variable capacitance is controlled (adjusted) by a feedback coefficient controller 401 in the accessory unit 202.

The accessory unit 202 includes the feedback coefficient controller 401, and adjusts the capacitance of the capacitor Cfb to the value set by the signal processing unit 201.

Although the description will now be continued with an example of the case where the feedback coefficient controller 401 in the accessory unit 202 controls the capacitance of the capacitor Cfb, it may be configured that the accessory unit 202 is not provided and the signal processing unit 201 directly controls the capacitance of the capacitor Cfb.

Since the signal processing unit 201 in the configuration shown in FIG. 19 performs processing on the basis of the flowcharts shown in FIGS. 15 and 16, description thereof will be omitted. In the above description, the processing of the signal processing unit 201 shown in FIG. 19 can be performed by replacing the current adjustment value with the feedback coefficient.

In this case, the signal processing unit 201 sets one feedback coefficient of a plurality of preset feedback coefficients, and the feedback coefficient controller 401 of the accessory unit 202 controls the capacitance of the capacitor Cfb in the S/H unit 111 so as to attain the feedback coefficient set by the signal processing unit 201.

The pixel value thus controlled is used to calculate the noise index value ni. Such the noise index value ni is calculated for each of the plurality of preset feedback coefficients, and the feedback coefficient at which the minimum noise index value ni is obtained is searched. Since the capacitance of the capacitor Cfb of the operational amplifier 131 is controlled with the feedback coefficient searched in this manner, it is possible to execute processing in which noise such as kTC noise is reduced.

Thus, also in a case where the feedback coefficient β is adjusted, noise can be canceled by the cancellation circuit included in the S/H unit 111, and moreover, setting the feedback coefficient β as described above makes it possible to perform fine adjustment for further suppressing the noise. In addition, although the noise generation amount may change depending on the usage environment such as temperature and humidity, executing the above processing make it possible to perform noise cancellation processing corresponding to a change in the noise amount due to a change in such usage environment.

<Case of Performing Adjustment with Connection Time>

Next, a case where noise is further reduced by adjusting a connection time Tint at which the capacitor Cint included in the S/H unit 111 is connected with the operational amplifier 131 will be described.

Figure 20:
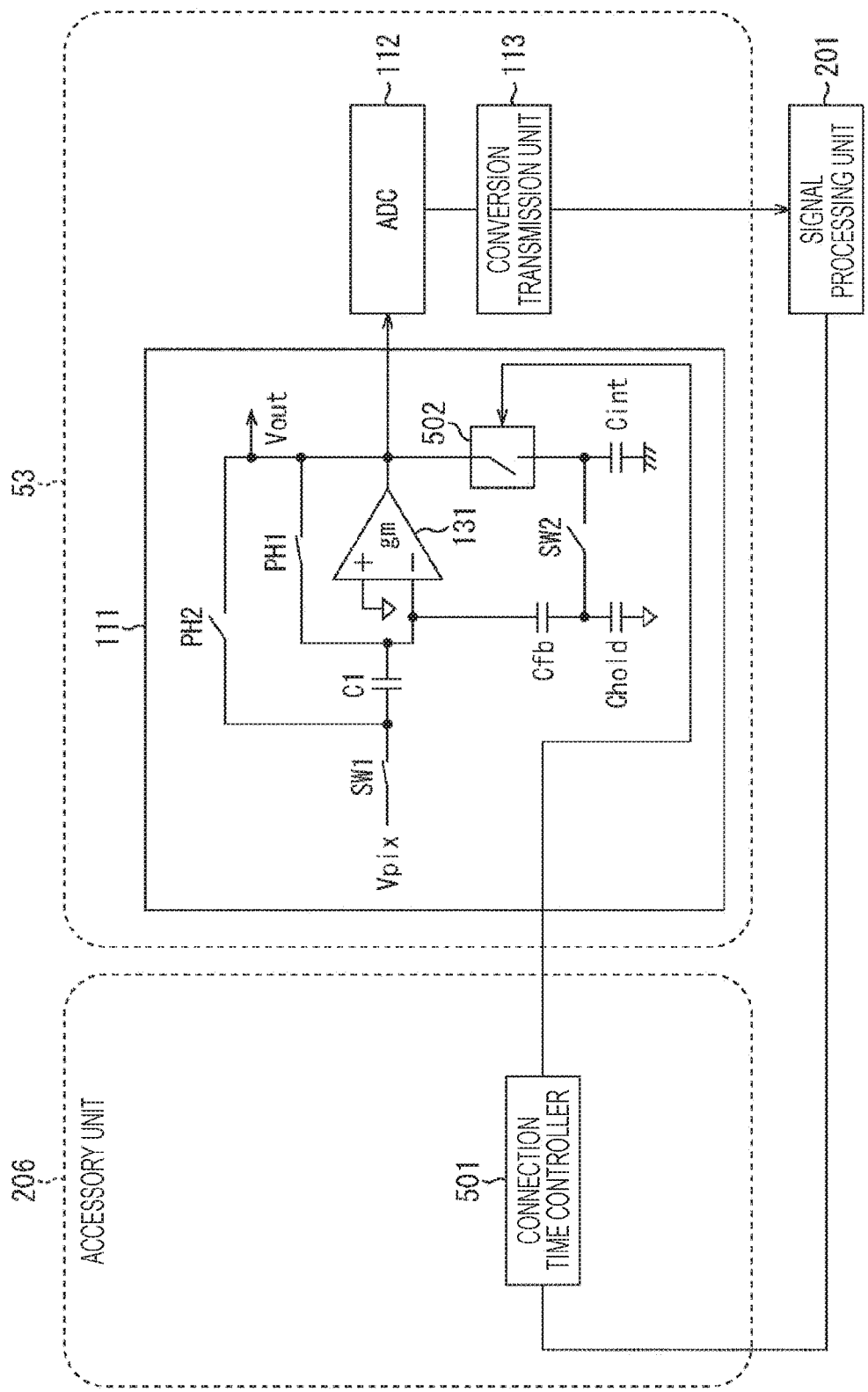
FIG. 20 is a diagram showing another configuration example of the S/H unit.

FIG. 20 is a diagram showing a configuration example when noise of the S/H unit 111 is reduced by adjusting the connection time Tint at which the capacitor Cint of the operational amplifier 131 is connected with the operational amplifier 131.

In a case where the performance of cancellation of noise is improved by adjusting the connection time Tint at which the capacitor Cint of the operational amplifier 131 is connected with the operational amplifier 131, a switch 502 is provided between the capacitor Cint and the operational amplifier 131, and the time (connection time Tint) at which the switch 502 is turned on is controlled (adjusted) by a connection time controller 501 in the accessory unit 202.

The accessory unit 202 includes the connection time controller 501, and adjusts the connection time of the switch 501 to the value set by the signal processing unit 201. By controlling the connection time of the switch 501, the time at which an electric charge is accumulated in the capacitor Cint is controlled.

Although the description will now be continued with an example of the case where the connection time controller 501 in the accessory unit 202 controls the connection time of the switch 501, it may be configured that the accessory unit 202 is not provided and the signal processing unit 201 directly controls the connection time of the switch 501.

Since the signal processing unit 201 in the configuration shown in FIG. 20 performs processing on the basis of the flowcharts shown in FIGS. 15 and 16, description thereof will be omitted. In the above description, the processing of the signal processing unit 201 shown in FIG. 20 can be performed by replacing the current adjustment value with the connection time.

In this case, the signal processing unit 201 sets one connection time of a plurality of preset connection times, and the connection time controller 501 of the accessory unit 202 controls the connection time of the switch 502 in the S/H unit 111 so as to attain the connection time set by the signal processing unit 201.

The pixel value thus controlled is used to calculate the noise index value ni. Such the noise index value ni is calculated for each of the plurality of preset connection times, and the connection time at which the minimum noise index value ni is obtained is searched. Since the time in which the electric charge is accumulated in the capacitor Cint of the operational amplifier 131 is controlled with the connection time searched in this manner, it is possible to execute processing in which noise such as kTC noise is reduced.

Thus, also in a case where the connection time of the switch 502 is adjusted, noise can be canceled by the cancellation circuit included in the S/H unit 111, and moreover, setting the connection time as described above makes it possible to perform fine adjustment for further suppressing the noise. In addition, although the noise generation amount may change depending on the usage environment such as temperature and humidity, executing the above processing make it possible to perform noise cancellation processing corresponding to a change in the noise amount due to a change in such usage environment.

It is to be noted that in the above-described embodiment, the description was given with the examples of the cases where noise is reduced by adjusting the transconductance gm of the operational amplifier 131, the capacitance value of the capacitor Cint, the feedback coefficient β of the capacitor Cfb, and the connection time of the switch 502.

As described above, these can be implemented individually but can also be implemented in combination. Noise may be reduced by a combination of the transconductor gm and the capacitance value of the capacitor Cint, for example.

It is to be noted that although in the above-described embodiment, the description was given with the example of the S/H unit included in the reading unit that reads a pixel value in the image-capturing apparatus, the S/H unit to which the present technology is applied can be applied also to an apparatus other than the image-capturing apparatus, and can be applied to a portion that performs sampling and holding.

<Configuration Example of Layer-Type Image-Capturing Apparatus to which Technology According to Present Disclosure can be Applied>

Figure 21A:
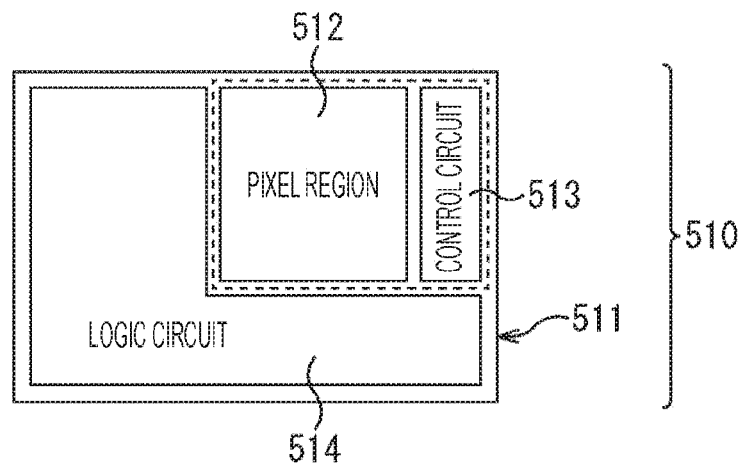
FIGS. 21A, 21B, and 21C are diagrams showing an outline of a configuration example of a layer-type solid-state imagSSe-capturing apparatus.
Figure 21B:
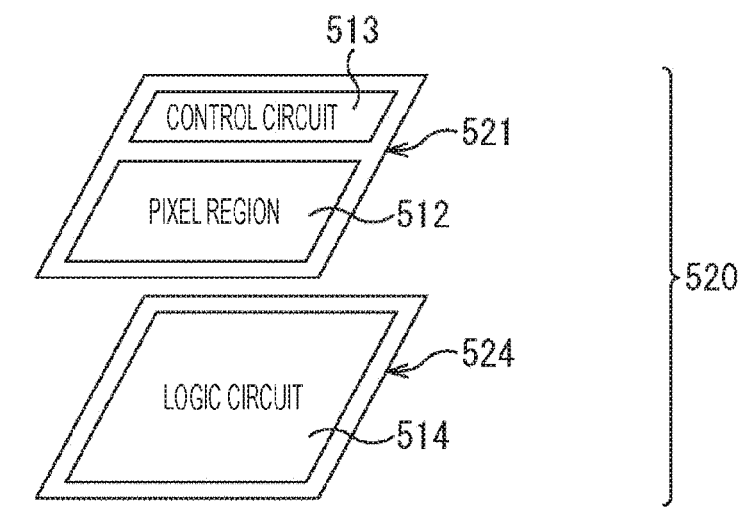
Figure 21C:
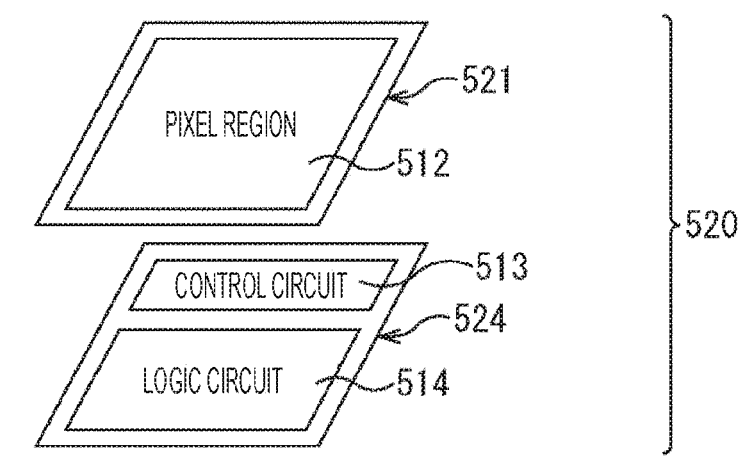

FIGS. 21A, 21B, and 21C are diagrams showing an outline of a configuration example of a layer-type solid-state image-capturing apparatus to which the technology according to the present disclosure can be applied.

FIG. 21A shows a schematic configuration example of a non-layer-type solid-state image-capturing apparatus. A solid-state image-capturing apparatus 510 includes one die (semiconductor substrate) 511 as shown in FIG. 21A. The die 511 is mounted with a pixel region 512 in which pixels are arranged in an array, a control circuit 513 that drives the pixels and performs various other controls, and a logic circuit 514 that performs signal processing.

The signal processing unit 201 and the accessory unit 202 in the above-described embodiment can be arranged in a region where the control circuit 513 and the logic circuit 514 are arranged.

FIGS. 21B and 21C show a schematic configuration example of a layer-type solid-state image-capturing apparatus. As shown FIGS. 21B and 21C, a solid-state image-capturing apparatus 520 is configured as one semiconductor chip in which two dies of a sensor die 521 and a logic die 524 are layered and electrically connected.

In FIG. 21B, the pixel region 512 and the control circuit 513 are mounted on the sensor die 521, and the logic circuit 514 including a signal processing circuit that performs signal processing is mounted on the logic die 524.

In FIG. 21C, the pixel region 512 is mounted on the sensor die 521, and the control circuit 513 and the logic circuit 514 are mounted on the logic die 524.

<Application Example to Endoscopic Surgery System>

The technology (present technology) according to the present disclosure can be applied to various products. For example, the technology of the present disclosure may be applied to an endoscopic surgery system.

Figure 22:
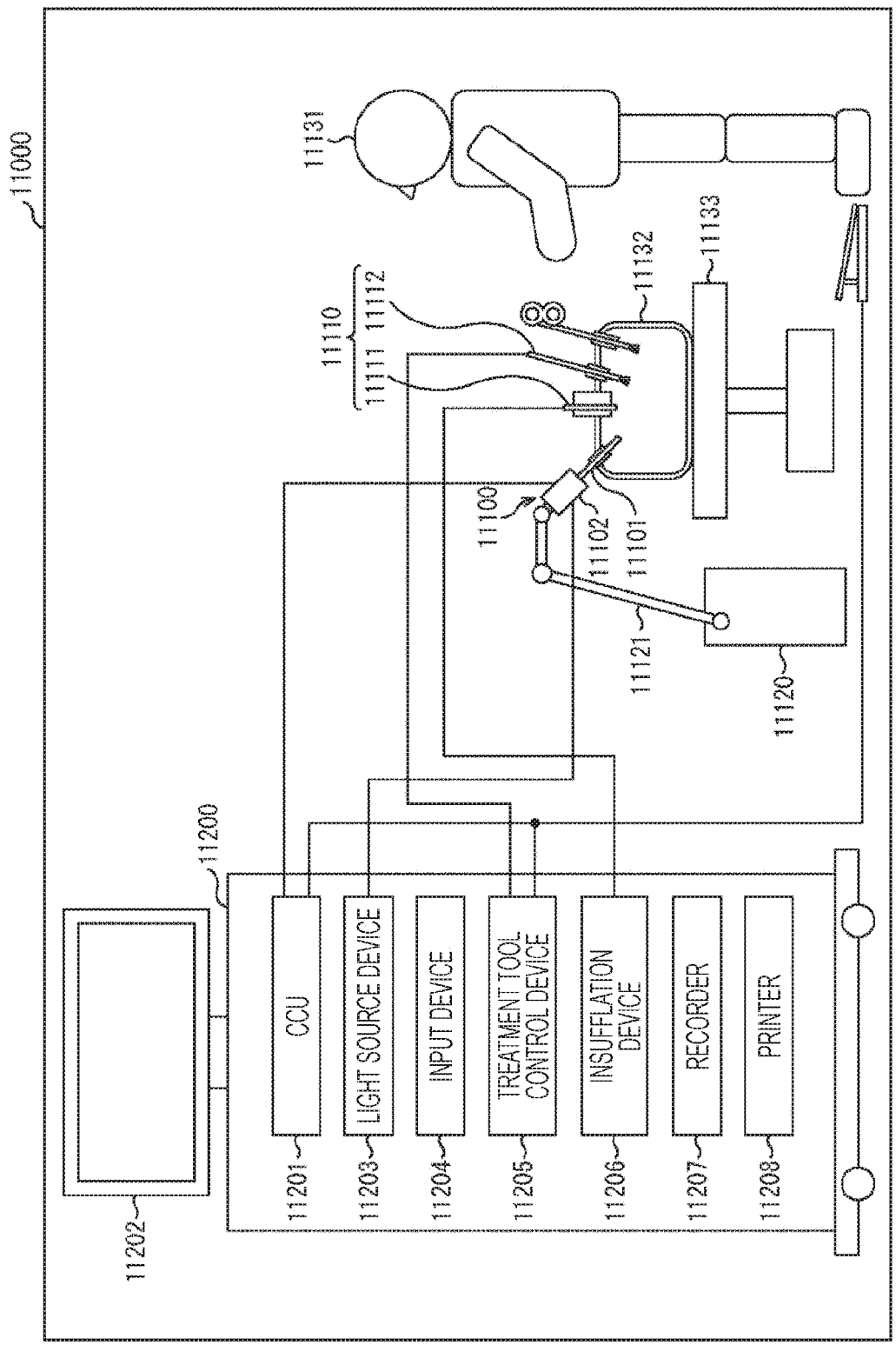
FIG. 22 is a diagram showing an example of a schematic configuration of an endoscopic surgery system.

FIG. 22 is a diagram showing an example of a schematic configuration of an endoscopic surgery system to which the technology (present technology) according to the present disclosure can be applied.

FIG. 22 illustrates a scene where an operator (medical doctor) 11131 is performing surgery on a patient 11132 on a patient bed 11133 using an endoscopic surgery system 11000. As illustrated, the endoscopic surgery system 11000 includes an endoscope 11100, other surgical instruments 11110 such as an insufflation tube 11111 and an energy treatment instrument 11112, a support arm apparatus 11120 that supports the endoscope 11100, and a cart 11200 on which various apparatuses for endoscopic surgery are mounted.

The endoscope 11100 includes a lens barrel 11101 whose region of a predetermined length from a tip end is inserted into the body cavity of the patient 11132, and a camera head 11102 connected to a base end of the lens barrel 11101. Although in the illustrated example, the endoscope 11100 is configured as a so-called rigid endoscope having the rigid lens barrel 11101, the endoscope 11100 may be configured as a so-called flexible endoscope having a flexible lens barrel.

The tip end of the lens barrel 11101 is provided with an opening into which an objective lens is fitted. A light source apparatus 11203 is connected to the endoscope 11100, and light generated by the light source apparatus 11203 is guided to the tip end of the lens barrel by a light guide extending inside the lens barrel 11101, and is emitted toward an observation target in the body cavity of the patient 11132 via the objective lens. It is to be noted that the endoscope 11100 may be a forward-viewing endoscope, an oblique-viewing endoscope, or a side-viewing endoscope.

Inside the camera head 11102 is provided with an optical system and an image-capturing device, and reflected light (observation light) from an observation target is collected on the image-capturing device by the optical system. The observation light is photoelectrically converted by the image-capturing device, and an electric signal corresponding to the observation light, that is, an image signal corresponding to the observation image is generated. The image signal is transmitted to a camera control unit (CCU) 11201 as raw data.

The CCU 11201 includes a central processing unit (CPU), a graphics processing unit (GPU), and the like, and integrally controls the operations of the endoscope 11100 and a display apparatus 11202. Furthermore, the CCU 11201 receives an image signal from the camera head 11102 and performs various image processing for displaying an image based on the image signal, such as development processing (demosaic processing), for example, on the image signal.

Under the control from the CCU 11201, the display apparatus 11202 displays an image based on the image signal on which image processing has been performed by the CCU 11201.

The light source apparatus 11203 includes, for example, a light source such as a light emitting diode (LED), and supplies irradiation light when capturing an image of a surgical site or the like to the endoscope 11100.

An input apparatus 11204 is an input interface to the endoscopic surgery system 11000. The user can input various kinds of information and instructions to the endoscopic surgery system 11000 via the input apparatus 11204. For example, the user inputs an instruction to change image capturing conditions (type of irradiation light, magnification, focal length, and the like) by the endoscope 11100.

A treatment instrument control apparatus 11205 controls driving of the energy treatment instrument 11112 for cauterization of tissue, incision, sealing of blood vessel, and the like. An insufflation apparatus 11206 feeds gas into the body cavity of the patient 11132 through the insufflation tube 11111 in order to expand the body cavity for the purpose of securing a visual field by the endoscope 11100 and securing a working space of the operator. A recorder 11207 is an apparatus capable of recording various kinds of information related to surgery. A printer 11208 is an apparatus capable of printing various types of information related to surgery in various formats such as text, images, or graphs.

It is to be noted that the light source apparatus 11203 that supplies, to the endoscope 11100, irradiation light when capturing an image of the surgical site may include a white light source including, for example, an LED, a laser light source, or a combination of them. In a case where a white light source includes a combination of RGB laser light sources, the output intensity and output timing of each color (each wavelength) can be controlled with high accuracy, and hence the white balance of the captured image can be adjusted in the light source apparatus 11203. In addition, in this case, by irradiating the observation target with laser light from the respective RGB laser light sources in a time division manner and controlling the driving of the image-capturing device of the camera head 11102 in synchronization with the irradiation timing, images corresponding to the respective RGB can be captured in a time division manner. According to the method, a color image can be obtained without providing a color filter in the image-capturing device.

In addition, the driving of the light source apparatus 11203 may be controlled so as to change the intensity of the output light at predetermined time intervals. By controlling the driving of the image-capturing device of the camera head 11102 in synchronization with the timing of change of the intensity of the light to acquire an image in time division manner and synthesizing the image, it is possible to generate an image with a high dynamic range free from blocked-up shadows and blown-out highlights.

In addition, the light source apparatus 11203 may be capable of supplying light of a predetermined wavelength band corresponding to special light observation. In the special light observation, so-called narrow band imaging is performed, in which an image of a predetermined tissue such as a blood vessel in a mucous membrane surface layer is captured with high contrast by irradiating light in a narrow band as compared with irradiation light (i.e., white light) in a normal observation by using the wavelength dependence of light absorption in the body tissue, for example. Alternatively, in the special light observation, fluorescence observation in which an image is obtained by fluorescence generated by emitting excitation light may be performed. In the fluorescence observation, it is possible to observe fluorescence from a body tissue (autofluorescence observation) by irradiating the body tissue with excitation light, to obtain a fluorescent image by locally injecting a reagent such as indocyanine green (ICG) into the body tissue and irradiating the body tissue with excitation light corresponding to the fluorescence wavelength of the reagent, or the like. The light source apparatus 11203 can be capable of supplying narrow-band light and/or excitation light corresponding to such special light observation.

Figure 23:
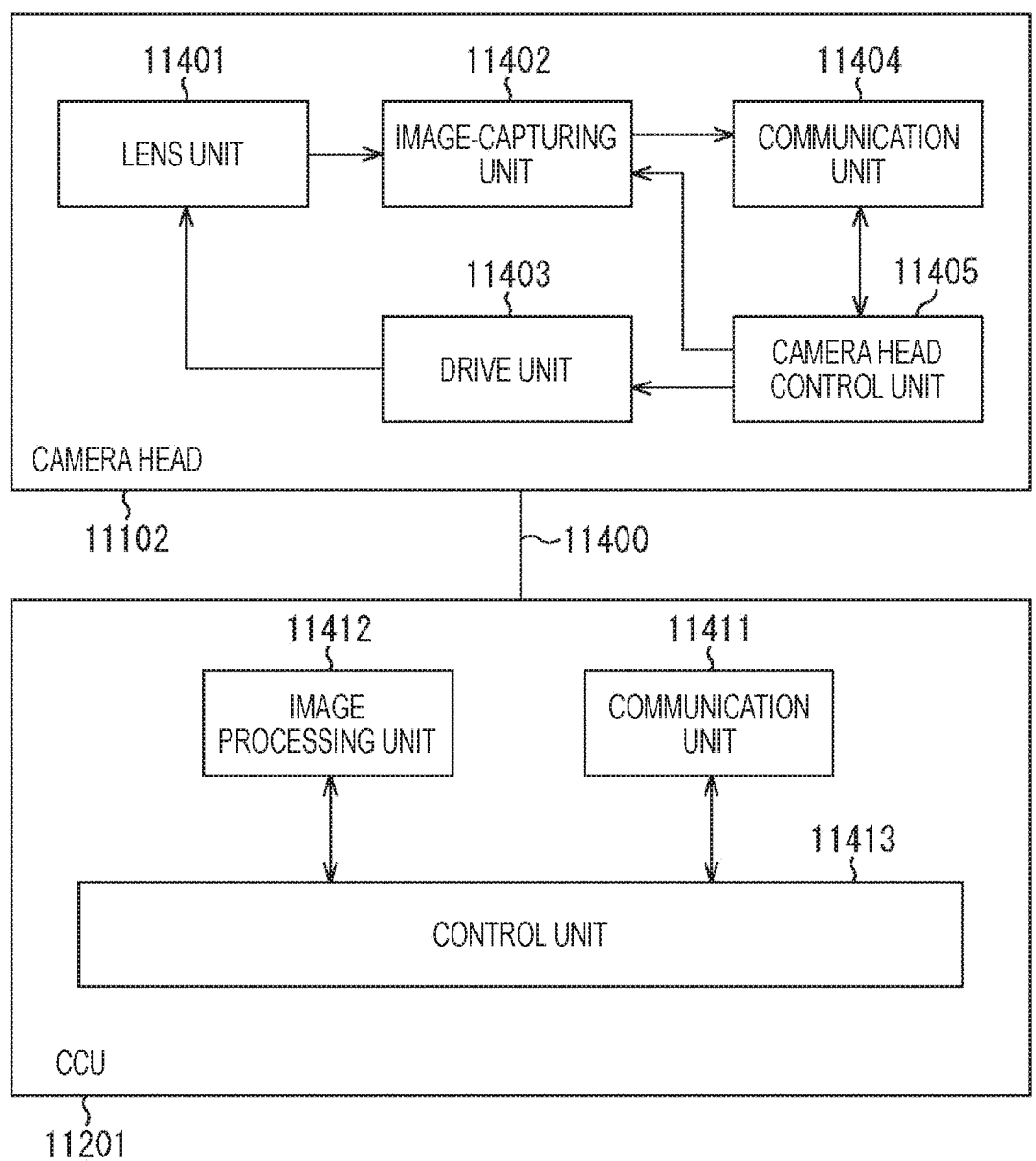
FIG. 23 is a block diagram showing an example of a function configuration of a camera head and a CCU.

FIG. 23 is a block diagram showing an example of the function configuration of the camera head 11102 and the CCU 11201 shown in FIG. 22.

The camera head 11102 has a lens unit 11401, an image-capturing unit 11402, a drive unit 11403, a communication unit 11404, and a camera head control unit 11405. The CCU 11201 has a communication unit 11411, an image processing unit 11412, and a control unit 11413. The camera head 11102 and the CCU 11201 are connected communicably to each other via a transmission cable 11400.

The lens unit 11401 is an optical system provided at a connection portion with the lens barrel 11101. Observation light taken in from the tip end of the lens barrel 11101 is guided to the camera head 11102 and enters the lens unit 11401. The lens unit 11401 is configured by combining a plurality of lenses including a zoom lens and a focus lens.

The number of image-capturing devices constituting the image-capturing unit 11402 may be one (so-called single-plate type) or may be a plurality (so-called multi-plate type). In a case where the image-capturing unit 11402 is configured as a multi-plate type, for example, each image-capturing device may generate image signals corresponding to RGB, respectively, and a color image may be obtained by combining these image signals. Alternatively, the image-capturing unit 11402 may have a pair of image-capturing devices for acquiring image signals respectively for the right eye and for the left eye corresponding to 3D (dimensional) display. Performing the 3D display allows the operator 11131 to more accurately grasp the depth of the body tissue in the surgical site. It is to be noted that in a case where the image-capturing unit 11402 is configured as a multi-plate type, a plurality of systems of the lens units 11401 can also be provided corresponding to the respective image-capturing device.

In addition, the image-capturing unit 11402 may not necessarily be provided in the camera head 11102. For example, the image-capturing unit 11402 may be provided inside the lens barrel 11101 immediately after the objective lens.

The drive unit 11403 is constituted by an actuator and moves the zoom lens and the focus lens of the lens unit 11401 by a predetermined distance along the optical axis under the control of the camera head control unit 11405. Thus, the magnification and focus of the image captured by the image-capturing unit 11402 can be appropriately adjusted.

The communication unit 11404 is constituted by a communication apparatus for transmitting and receiving various kinds of information to and from the CCU 11201. The communication unit 11404 transmits the image signal obtained from the image-capturing unit 11402 to the CCU 11201 as raw data via the transmission cable 11400.

In addition, the communication unit 11404 receives a control signal for controlling the driving of the camera head 11102 from the CCU 11201 and supplies the control signal to the camera head control unit 11405. The control signal includes, for example, information regarding image capturing conditions such as information for specifying a frame rate of the captured image, information for specifying an exposure value at the time of image capturing, and/or information for specifying the magnification and the focus of the captured image.

It is to be noted that the image capturing conditions such as the frame rate, exposure value, magnification, and focus may be appropriately specified by the user, or may be automatically set by the control unit 11413 of the CCU 11201 on the basis of the acquired image signal. In the latter case, a so-called auto exposure (AE) function, an auto focus (AF) function, and an auto white balance (AWB) function are mounted on the endoscope 11100.

The camera head control unit 11405 controls driving of the camera head 11102 on the basis of a control signal from the CCU 11201 received via the communication unit 11404.

The communication unit 11411 is constituted by a communication apparatus for transmitting and receiving various kinds of information to and from the camera head 11102. The communication unit 11411 receives an image signal transmitted from the camera head 11102 via the transmission cable 11400.

In addition, the communication unit 11411 transmits a control signal for controlling the driving of the camera head 11102 to the camera head 11102. The image signal and the control signal can be transmitted by electric communication, optical communication, or the like.

The image processing unit 11412 performs various kinds of image processing on an image signal that is raw data transmitted from the camera head 11102.

The control unit 11413 performs image capturing of the surgical site or the like by the endoscope 11100 and various controls related to display of the captured image obtained by the image capturing of the surgical site or the like. For example, the control unit 11413 generates a control signal for controlling the driving of the camera head 11102.

In addition, the control unit 11413 causes the display apparatus 11202 to display a captured image of the surgical site or the like on the basis of the image signal to which image processing has been performed by the image processing unit 11412. At this time, the control unit 11413 may recognize various objects in the captured image using various image recognition technologies. For example, by detecting a shape, color, or the like of an edge of an object included in a captured image, the control unit 11413 can recognize a surgical instrument such as a forceps, a specific living body part, bleeding, mist at the time of use of the energy treatment instrument 11112, and the like. When causing the display apparatus 11202 to display the captured image, the control unit 11413 may superimpose various kinds of surgery support information on the image of the surgical site by using the recognition result. Superimposing the surgery support information and presenting it to the operator 11131 allow the burden on the operator 11131 to be reduced and the operator 11131 to surely proceed with the surgery.

The transmission cable 11400 connecting the camera head 11102 and the CCU 11201 is an electric signal cable corresponding to communication of an electric signal, an optical fiber corresponding to optical communication, or a composite cable of them.

Although in the illustrated example here, communication is performed by wire using the transmission cable 11400, communication between the camera head 11102 and the CCU 11201 may be performed by wireless.

<Application Example to Mobile Objects>

The technology (present technology) according to the present disclosure can be applied to various products. For example, the technology according to the present disclosure may be implemented as an apparatus mounted on any type of mobile objects such as an automobile, an electric vehicle, a hybrid electric vehicle, a motorcycle, a bicycle, a personal mobility, an airplane, a drone, a ship, and a robot.

Figure 24:
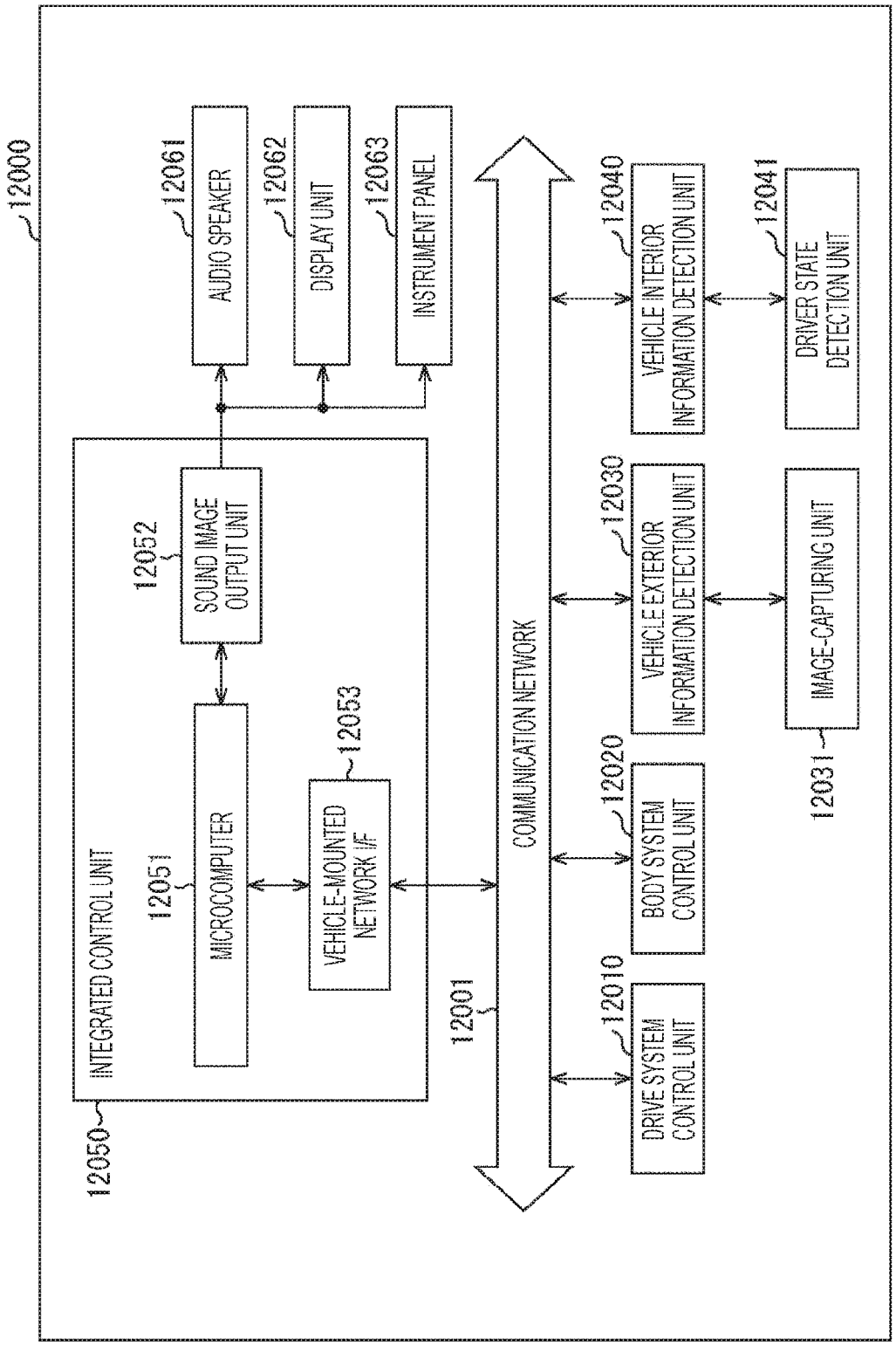
FIG. 24 is a block diagram showing an example of a schematic configuration of a vehicle control system.

FIG. 24 is a block diagram showing a schematic configuration example of a vehicle control system that is an example of a mobile object control system to which the technology according to the present disclosure can be applied.

A vehicle control system 12000 includes a plurality of electronic control units connected via a communication network 12001. In the example shown in FIG. 24, the vehicle control system 12000 includes a drive system control unit 12010, a body system control unit 12020, a vehicle exterior information detection unit 12030, a vehicle interior information detection unit 12040, and an integrated control unit 12050. In addition, as the function configuration of the integrated control unit 12050, a microcomputer 12051, a sound image output unit 12052, and a vehicle-mounted network interface (I/F) 12053 are illustrated.

The drive system control unit 12010 controls the operation of an apparatus related to the drive system of the vehicle in accordance with various programs. For example, the drive system control unit 12010 functions as a control apparatus such as a drive force generation apparatus for generating a vehicle drive force such as an internal combustion engine or a drive motor, a drive force transmission mechanism for transmitting a drive force to wheels, a steering mechanism for adjusting a steering angle of the vehicle, and a braking apparatus that generates a brake force of the vehicle.

The body system control unit 12020 controls the operation of various apparatuses mounted on the vehicle body in accordance with various programs. For example, the body system control unit 12020 functions as a keyless entry system, a smart key system, a power window apparatus, or a control apparatus for various lamps such as a headlamp, a rear lamp, a brake lamp, a blinker, or a fog lamp. In this case, the body system control unit 12020 can receive radio waves transmitted from a mobile device substituting for a key or signals of various switches. The body system control unit 12020 receives these radio waves or signals and controls a vehicle door lock apparatus, a power window apparatus, a lamp, and the like.

The vehicle exterior information detection unit 12030 detects information outside the vehicle mounted with the vehicle control system 12000. For example, an image-capturing unit 12031 is connected to the vehicle exterior information detection unit 12030. The vehicle exterior information detection unit 12030 causes the image-capturing unit 12031 to capture an image of an outside of the vehicle and receives the captured image. The vehicle exterior information detection unit 12030 may perform object detection processing or distance detection processing of a person, a vehicle, an obstacle, a sign, a character on a road surface, or the like on the basis of the received image.

The image-capturing unit 12031 is an optical sensor that receives light and outputs an electric signal in accordance with the amount of light received. The image-capturing unit 12031 can output an electric signal as an image or as distance measurement information. In addition, the light received by the image-capturing unit 12031 may be visible light or non-visible light such as infrared light.

The vehicle interior information detection unit 12040 detects information related to vehicle interior. The vehicle interior information detection unit 12040 is connected with, for example, a driver state detection unit 12041 that detects the state of the driver. The driver state detection unit 12041 includes, for example, a camera that captures an image of the driver, and, on the basis of detection information input from the driver state detection unit 12041, the vehicle interior information detection unit 12040 may calculate the degree of fatigue or the degree of concentration of the driver or may determine whether or not the driver is dozing off.

On the basis of information outside and inside the vehicle acquired by the vehicle exterior information detection unit 12030 or the vehicle interior information detection unit 12040, the microcomputer 12051 can calculate control target values of the drive force generation apparatus, the steering mechanism, or the braking apparatus and output a control command to the drive system control unit 12010. For example, the microcomputer 12051 can perform cooperative control for the purpose of realizing the function of an advanced driver assistance system (ADAS) including collision avoidance or impact mitigation of the vehicle, following traveling based on the inter-vehicle distance, vehicle speed maintenance traveling, vehicle collision warning, vehicle lane departure warning, or the like.

In addition, by controlling the drive force generation apparatus, the steering mechanism, the braking apparatus, or the like on the basis of information related to the surroundings of the vehicle acquired by the vehicle exterior information detection unit 12030 or the vehicle interior information detection unit 12040, the microcomputer 12051 is capable of performing cooperative control for the purpose of automatic driving or the like of autonomously traveling without depending on the operation of the driver.

In addition, the microcomputer 12051 can output a control command to the body system control unit 12030 on the basis of vehicle exterior information acquired by the vehicle exterior information detection unit 12030. For example, the microcomputer 12051 can control the headlamp in accordance with the position of the preceding vehicle or oncoming vehicle detected by the vehicle exterior information detection unit 12030, and can perform cooperative control for the purpose of anti-glare such as switching high beam to low beam.

The sound image output unit 12052 transmits an output signal of at least one of a sound or an image to an output apparatus capable of visually or aurally notifying the vehicle passenger or the vehicle exterior of information. FIG. 24 gives examples of an audio speaker 12061, a display unit 12062, and an instrument panel 12063 as output apparatuses. The display unit 12062 may include at least one of an onboard display or a head-up display, for example.

Figure 25:
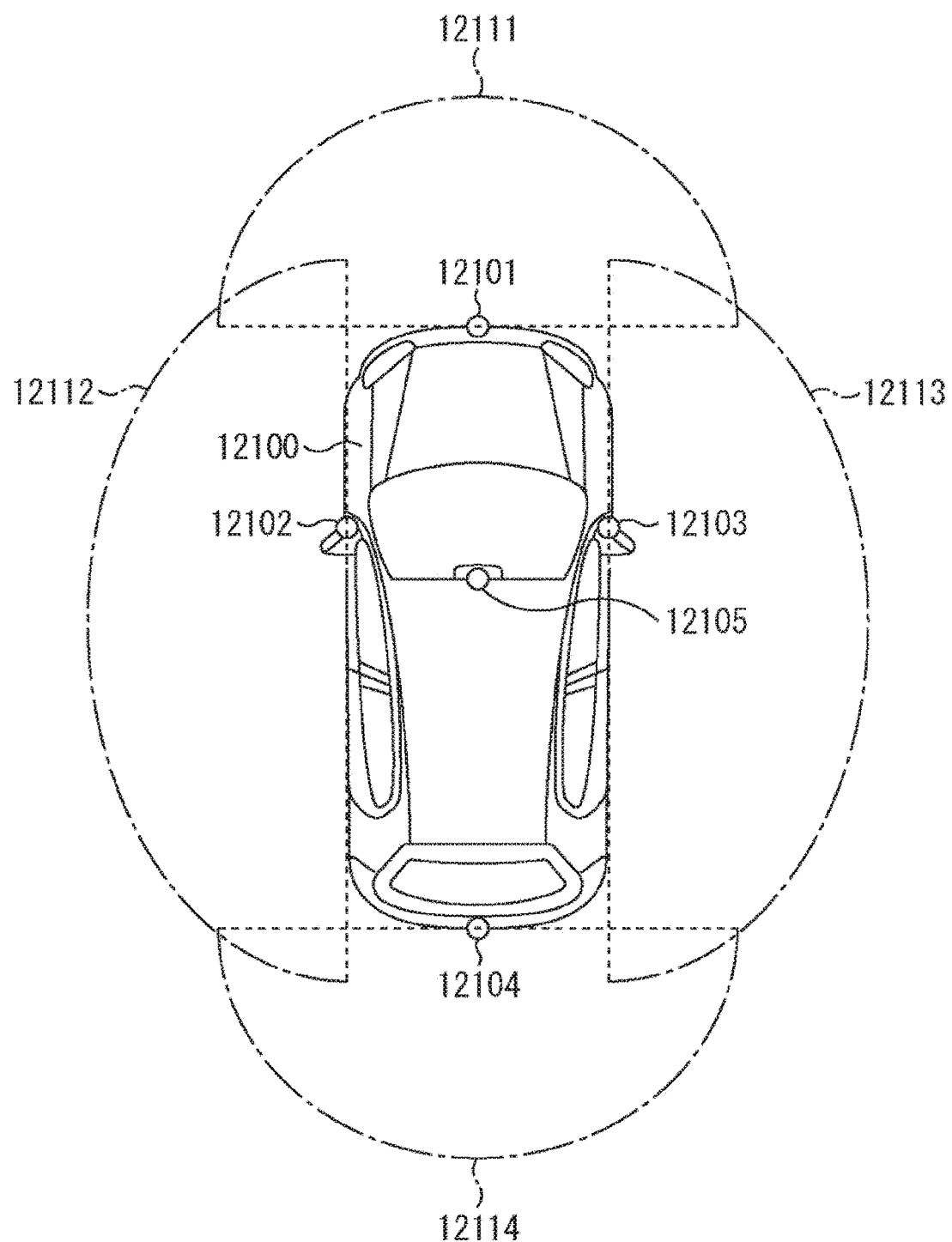
FIG. 25 is an explanatory diagram showing an example of installation positions of a vehicle exterior information detection unit and an image-capturing unit.

FIG. 25 is a diagram showing an example of the installation position of the image-capturing unit 12031.

In FIG. 25, the image-capturing unit 12031 has image-capturing units 12101, 12102, 12103, 12104, and 12105.

The image-capturing units 12101, 12102, 12103, 12104, and 12105 are provided in a vehicle 12100 at positions such as a front nose, a side mirror, a rear bumper, a back door, and an upper part of a windshield in the vehicle interior, for example. The image-capturing unit 12101 provided in the front nose and the image-capturing unit 12105 provided in the upper part of the windshield in the vehicle interior mainly acquire images in front of the vehicle 12100. The image-capturing units 12102 and 12103 provided in the side mirrors mainly acquire images on the side of the vehicle 12100. The image-capturing unit 12104 provided in the rear bumper or the back door mainly acquires images of the rear of the vehicle 12100. The image-capturing unit 12105 provided on the upper part of the windshield in the vehicle interior is mainly used for detection of a preceding vehicle, a pedestrian, an obstacle, a traffic signal, a traffic sign, a lane, or the like.

It is to be noted that FIG. 25 shows an example of the image capturing range of the image-capturing units 12101 to 12104. An image capturing range 12111 indicates the image capturing range of the image-capturing unit 12101 provided in the front nose, image capturing ranges 12112 and 12113 indicate the image capturing ranges of the image-capturing units 12102 and 12103 provided on the side mirrors, respectively, and an image capturing range 12114 indicates the image capturing range of the image-capturing unit 12104 provided in the rear bumper or the back door. For example, the image data captured by the image-capturing units 12101 to 12104 are superimposed, whereby a downward view of the vehicle 12100 viewed from above is obtained.

At least one of the image-capturing units 12101 to 12104 may have a function of acquiring distance information. For example, at least one of the image-capturing units 12101 to 12104 may be a stereo camera including a plurality of image-capturing devices or may be an image-capturing device having a pixel for phase difference detection.

For example, by obtaining the distance to each three-dimensional object in the image capturing ranges 12111 to 12114 and the temporal change (relative speed with respect to the vehicle 12100) of the distance on the basis of the distance information obtained from the image-capturing units 12101 to 12104, the microcomputer 12051 can extract, as a preceding vehicle, a three-dimensional object traveling at a predetermined speed (e.g., 0 km/h or greater) in substantially the same direction as the vehicle 12100, particularly the closest three-dimensional object on the traveling road of the vehicle 12100. Furthermore, the microcomputer 12051 can set the inter-vehicle distance to be secured in advance between the own vehicle and the preceding vehicle, and can perform automatic brake control (including following stop control), automatic acceleration control (including following start control), and the like. It is thus possible to perform cooperative control for the purpose of automatic driving or the like of autonomously traveling without depending on the operation of the driver.

For example, on the basis of the distance information obtained from the image-capturing units 12101 to 12104, the microcomputer 12051 can classify and extract three-dimensional object data related to three-dimensional objects into two-wheeled vehicles, ordinary vehicles, large-sized vehicles, pedestrians, and other three-dimensional objects such as utility poles and the like, and can use them for automatic avoidance of obstacles. For example, the microcomputer 12051 discriminates obstacles around the vehicle 12100 into obstacles visually recognizable to the driver of the vehicle 12100 and obstacles difficult to visually recognize. Then, the microcomputer 12051 judges collision risk indicating the collision risk with each obstacle, and when the collision risk is equal to or greater than a set value and there is a possibility of collision, the microcomputer can provide driving support for collision avoidance by alerting the driver via the audio speaker 12061 or the display unit 12062 and by performing forced deceleration or avoidance steering via the drive system control unit 12010.

At least one of the image-capturing units 12101 to 12104 may be an infrared camera that detects infrared rays. For example, the microcomputer 12051 can recognize a pedestrian by determining whether or not a pedestrian is present in the captured images by the image-capturing units 12101 to 12104. Such the recognition of a pedestrian is performed by, for example, a procedure of extracting feature points in the captured images by the image-capturing units 12101 to 12104 as infrared cameras, and a procedure of determining whether or not an object is a pedestrian by performing pattern matching processing on a series of feature points indicating the outline of the object. When the microcomputer 12051 determines that a pedestrian is present in the captured images by the image-capturing units 12101 to 12104 and recognizes the pedestrian, the sound image output unit 12052 controls the display unit 12062 so as to superimpose and display a rectangular outline for emphasis on the recognized pedestrian. In addition, the sound image output unit 12052 may control the display unit 12062 so as to display an icon or the like indicating a pedestrian at a desired position.

It is to be noted that the effects described in the present description are merely exemplary, and are not limited thereto, and other effects may be present.

It is to be noted that the embodiment of the present technology is not limited to the above-described embodiment, and various modifications may be made in a scope without departing from the spirit of the present technology.

It is to be noted that the present technology can have the following configurations.

(1)

An image-capturing device, including:

a sample-hold unit that performs sampling and holding of a pixel signal;

an analog-digital (AD) conversion unit that performs AD conversion of the pixel signal; and a setting unit that sets a transconductance of an operational amplifier included in the sample-hold unit to a transconductance where kTC noise is minimized.

(2)

The image-capturing device according to (1), in which the setting unit sets a plurality of transconductances, calculates the kTC noise by using a pixel signal from the AD conversion unit each time of setting, and sets the transconductance where a calculated value becomes a minimum value to the transconductance of the operational amplifier.

(3)

The image-capturing device according to (1) or (2), further including:

a kTC cancellation unit that reduces the kTC noise by accumulating an electric charge corresponding to a variation in an output voltage of the sample-hold unit due to the kTC noise and feeding back the electric charge to the sample-hold unit.

(4)

An image-capturing device, including:

a sample-hold unit that performs sampling and holding of a pixel signal;

a kTC cancellation unit that reduces kTC noise in the sample-hold unit;

an analog-digital (AD) conversion unit that performs AD conversion of the pixel signal; and a setting unit that sets a capacitance value of a capacitor included in the kTC cancellation unit to a capacitance value where the kTC noise is minimized.

(5)

The image-capturing device according to (4), in which the setting unit sets a plurality of capacitance values, calculates the kTC noise by using a pixel signal from the AD conversion unit each time of setting, and sets the capacitance value where a calculated value becomes a minimum value to a capacitance value of a capacitor included in the kTC cancellation unit.

(6)

The image-capturing device according to (4) or (5), in which the kTC cancellation unit includes a capacitor that accumulates an electric charge corresponding to a variation in an output voltage of the sample-hold unit due to the kTC noise, and the setting unit sets a capacitance value of the capacitor.

(7)

The image-capturing device according to any of (4) to (6), in which the kTC cancellation unit includes a capacitor that accumulates an electric charge corresponding to a variation in an output voltage of the sample-hold unit due to the kTC noise and feeds back the electric charge to the sample-hold unit, and the setting unit sets a capacitance value of the capacitor.

(8)

The image-capturing device according to any of (4) to (7), in which the kTC cancellation unit includes a capacitor that accumulates an electric charge corresponding to a variation in an output voltage of the sample-hold unit due to the kTC noise, and a switch that turns on or off a connection between the sample-hold unit and the capacitor, and the setting unit sets a connection time of the switch.

(9)

An electronic apparatus, including:

an image-capturing device; and a signal processing unit that processes a signal that is output from the image-capturing device, in which the image-capturing device includes a sample-hold unit that performs sampling and holding of a pixel signal, an analog-digital (AD) conversion unit that performs AD conversion of the pixel signal, and a setting unit that sets a transconductance of an operational amplifier included in the sample-hold unit to a transconductance where kTC noise is minimized.

(10)

An electronic apparatus, including:

an image-capturing device; and a signal processing unit that processes a signal that is output from the image-capturing device, in which the image-capturing device includes a sample-hold unit that performs sampling and holding of a pixel signal, a kTC cancellation unit that reduces kTC noise in the sample-hold unit, an analog-digital (AD) conversion unit that performs AD conversion of the pixel signal, and a setting unit that sets a capacitance value of a capacitor included in the kTC cancellation unit to a capacitance value where the kTC noise is minimized.

REFERENCE SIGNS LIST

10 Image-capturing apparatus
11 Lens group
12 Image-capturing device
13 DSP circuit
14 Frame memory
15 Display unit
16 Recording unit
17 Operation system
18 Power supply system
19 Bus line
20 CPU
50 Pixel
51 Pixel array unit
52 Row selection unit
53 Reading unit
54 Control line
55 Vertical signal line 72 Transfer transistor
74 Reset transistor
75 Amplification transistor
76 Selection transistor
111 S/H unit
113 Conversion transmission unit
131 Operational amplifier
201 Signal processing unit
202 Accessory unit
221 Variable current source
231 Variable current source
301 Capacitance value controller
401 Feedback coefficient controller
501 Connection time controller
502 Switch

The invention claimed is:

1. An image-capturing device, comprising:
a sample-hold circuit configured to sample and hold a pixel signal, wherein the sample-hold circuit includes an operational amplifier; and
an analog-digital (AD) converter configured to perform AD conversion of the pixel signal, wherein
the sample-hold circuit is further configured to:
set a plurality of transconductance values of the operational amplifier;
calculate a plurality of kTC noise values for the plurality of transconductance values based on the AD converted pixel signal, wherein each kTC noise value of the plurality of kTC noise values corresponds to a respective transconductance value of the plurality of transconductance values; and
set a transconductance value among the plurality of transconductance values, wherein the set transconductance value corresponds to a specific kTC noise value which is a minimum value among the plurality of calculated kTC noise values.

2. The image-capturing device according to claim 1, further comprising a kTC cancellation circuit configured to:
control accumulation of an electric charge, wherein
the electric charge corresponds to a variation in an output voltage of the sample-hold circuit, and
the variation in the output voltage is based on the specific kTC noise value;
reduce the specific kTC noise value based on the accumulation of the electric charge; and
feed back the electric charge to the sample-hold circuit.

3. An image-capturing device, comprising:
a sample-hold circuit configured to sample and hold a pixel signal;
a kTC cancellation circuit that includes a capacitor;
an analog-digital (AD) converter configured to perform AD conversion of the pixel signal, wherein
the sample-hold circuit is further configured to:
set a plurality of capacitance values of the capacitor;
calculate a plurality of kTC noise values for the plurality of capacitance values based on the AD converted pixel signal, wherein each kTC noise value of the plurality of kTC noise values corresponds to a respective capacitance value of the plurality of capacitance values; and
set a capacitance value among the plurality of capacitance values, wherein the set capacitance value corresponds to a specific kTC noise value which is a minimum value among the plurality of calculated kTC noise values.

4. The image-capturing device according to claim 3, wherein
the capacitor is configured to accumulate an electric charge,
the electric charge corresponds to a variation in an output voltage of the sample-hold circuit,
the variation in the output voltage is based on the specific kTC noise value, and
the sample-hold circuit is further configured to set the capacitance value of the capacitor based on the accumulated electric charge.

5. The image-capturing device according to claim 3, wherein
the capacitor is configured to accumulate an electric charge,
the electric charge corresponds to a variation in an output voltage of the sample-hold circuit,
the variation in the output voltage is based on the specific kTC noise value,
the kTC cancelation circuit is further configured to feed back the electric charge to the sample-hold circuit, and
the sample-hold circuit is further configured to set the capacitance value of the capacitor based on the electric charge fed back from the kTC cancelation circuit.

6. The image-capturing device according to claim 3, wherein
the capacitor is configured to accumulate an electric charge,
the electric charge corresponds to a variation in an output voltage of the sample-hold circuit,
the variation in the output voltage is based on the specific kTC noise value,
the kTC cancelation circuit further includes a switch configured to one of turn on or turn off a connection between the sample-hold circuit and the capacitor, and
the sample-hold circuit is further configured to set a connection time of the switch.

7. An electronic apparatus, comprising:
an image-capturing device; and
a signal processor configured to process a signal that is output from the image-capturing device, wherein
the image-capturing device includes:
a sample-hold circuit configured to sample and hold a pixel signal and
an analog-digital (AD) converter configured to perform AD conversion of the pixel signal, wherein
the sample-hold circuit is further configured to:
set a plurality of transconductance values of the operational amplifier;
calculate a plurality of kTC noise values for the plurality of transconductance values based on the AD converted pixel signal, wherein each kTC noise value of the plurality of kTC noise values corresponds to a respective transconductance value of the plurality of transconductance values; and
set a transconductance value among the plurality of transconductance values, wherein the set transconductance value corresponds to a specific kTC noise value which is a minimum value among the plurality of calculated kTC noise values.

8. An electronic apparatus, comprising:
an image-capturing device; and
a signal processor configured to process a signal that is output from the image-capturing device, wherein
the image-capturing device includes:

a sample-hold circuit configured to sample and hold a pixel signal, a kTC cancellation circuit that includes a capacitor, and an analog-digital (AD) converter configured to perform AD conversion of the pixel signal, wherein the sample-hold circuit is further configured to:

set a plurality of capacitance values of the capacitor;

calculate a plurality of kTC noise values for the plurality of capacitance values based on the AD converted pixel signal, wherein each kTC noise value of the plurality of kTC noise values corresponds to a respective capacitance value of the plurality of capacitance values; and seta capacitance value among the plurality of capacitance values, wherein the set capacitance value corresponds to a specific kTC noise value which is a minimum value among the plurality of calculated kTC noise values.

* * * * *